US010064220B2

(12) United States Patent
Yano et al.

(10) Patent No.: US 10,064,220 B2
(45) Date of Patent: Aug. 28, 2018

(54) WIRELESS COMMUNICATIONS SYSTEM USING RANDOM ACCESS PROCEDURE

(71) Applicant: FUJITSU LIMITED, Kawasaki-shi, Kanagawa (JP)

(72) Inventors: Tetsuya Yano, Yokohama (JP); Yoshiaki Ohta, Yokohama (JP); Shinichiro Aikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/714,294

(22) Filed: Sep. 25, 2017

(65) Prior Publication Data

US 2018/0020486 A1    Jan. 18, 2018

Related U.S. Application Data

(63) Continuation of application No. PCT/JP2015/061146, filed on Apr. 9, 2015.

(51) Int. Cl.
H04W 74/08 (2009.01)
H04W 72/04 (2009.01)
(Continued)

(52) U.S. Cl.
CPC ... *H04W 74/0833* (2013.01); *H04W 72/0486* (2013.01); *H04W 72/085* (2013.01); *H04W 72/10* (2013.01); *H04W 72/14* (2013.01)

(58) Field of Classification Search
CPC ......... H04W 74/0833; H04W 72/0486; H04W 72/085; H04W 72/10; H04W 72/14
(Continued)

(56) References Cited

U.S. PATENT DOCUMENTS

2010/0009682 A1   1/2010  Iwamura et al.
2010/0178920 A1*  7/2010  Kitazoe ............ H04W 36/0055
                                                    455/436
(Continued)

FOREIGN PATENT DOCUMENTS

JP     2008-92381 A     4/2008
WO  2008/044526 A1     4/2008
(Continued)

OTHER PUBLICATIONS

3GPP TS 36.300 V12.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2014.
(Continued)

*Primary Examiner* — Marisol Figueroa
(74) *Attorney, Agent, or Firm* — Myers Wolin, LLC

(57) ABSTRACT

A wireless communications system includes a first wireless apparatus; and a second wireless apparatus. In a case of receiving from the second wireless apparatus, a random access preamble in an initial access of the second wireless apparatus to a first cell of the first wireless apparatus, the first wireless apparatus transmits a response signal for the random access preamble, the response signal including an instruction to change a connected cell to a cell different from the first cell. The second wireless apparatus transmits based on the instruction included in the response signal transmitted from the first wireless apparatus, a random access preamble in an initial access to a second cell different from the first cell.

20 Claims, 31 Drawing Sheets

(51) Int. Cl.
*H04W 72/10* (2009.01)
*H04W 72/14* (2009.01)
*H04W 72/08* (2009.01)

(58) Field of Classification Search
USPC .................................................. 455/436–444
See application file for complete search history.

(56) References Cited

U.S. PATENT DOCUMENTS

| | | | |
|---|---|---|---|
| 2013/0010711 A1* | 1/2013 | Larsson | H04W 56/0005 370/329 |
| 2015/0011215 A1 | 1/2015 | Uemura et al. | |
| 2016/0278129 A1* | 9/2016 | Lopez-Perez | H04W 48/00 |

FOREIGN PATENT DOCUMENTS

| | | |
|---|---|---|
| WO | 2012/031389 A1 | 3/2012 |
| WO | 2013/056150 A1 | 4/2013 |
| WO | 2013/099649 A1 | 7/2013 |

OTHER PUBLICATIONS

3GPP TS 36.211 V12.1.0, "3rd Generation Partnership Project; Technical Specification Group Radio Access Network; Evolved Universal Terrestrial Radio Access (E-UTRA); Physical channels and modulation (Release 12)", Mar. 2014.
3GPP TS 36.212 V12.0.0, "3rd Generation Partnership Project; Technical Specification Group Radio Access Network; Evolved Universal Terrestrial Radio Access (E-UTRA); Multiplexing and channel coding (Release 12)", Dec. 2013.
3GPP Ts 36.213 V12.1.0, "3rd Generation Partnership Project; Technical Specification Group Radio Access Network; Evolved Universal Terrestrial Radio Access (E-UTRA); Physical layer procedures (Release 12)", Mar. 2014.
3GPP TS 36.321 V12.0.0, "3rd Generation Partnership Project; Technical Specification Group Radio Access Network; Evolved Universal Terrestrial Radio Access (E-UTRA); Medium Access Control (MAC) protocol specification (Release 12)", Dec. 2013.
3GPP TS 36.322 V11.0.0, "3rd Generation Partnership Project; Technical Specification Group Radio Access Network; Evolved Universal Terrestrial Radio Access (E-UTRA); Radio Link Control (RLC) protocol specification (Release 11)", Sep. 2012.
3GPP TS 36.323 V11.2.0, "3rd Generation Partnership Project; Technical Specification Group Radio Access Network; Evolved Universal Terrestrial Radio Access (E-UTRA); Packet Data Convergence Protocol (PDCP) specification (Release 11)", Mar. 2013.
3GPP TS 36.331 V12.0.0, "3rd Generation Partnership Project; Technical Specification Group Radio Access Network; Evolved Universal Terrestrial Radio Access (E-UTRA); Radio Resource Control (RRC); Protocol specification (Release 12)", Dec. 2013.
3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.
Verizon et al., "New WI proposal for Multicarrier Load Distribution of UEs in LTE", Agenda Item: 14.1.2, 3GPP TSG-RAN Meeting #67, RP-150491, Shanghai, China, Mar. 9-12, 2015.
Verizon et al., "Motivation paper for New WI proposal for Multicarrier Load distribution of UEs in LTE", Agenda Item: 14.1.2, 3GPP TSG-RAN Meeting #67, RP-150201, Shanghai, China, Mar. 9-12, 2015.
Alcatel-Lucent et al. ,"Idle UE Distribution in Macro Only System and HetNets", Agenda Item: 7.11.1, 3GPP TSG-RAN WG2 Meeting #86, R2-142495, Seoul, South Korea, May 19-23, 2014.
LG Electronics, "Resolving LTE-A downlink carrier amiguity with RACH", Agenda Item: 15.4, 3GPP TSG-RAN WG1 Meeting #57, R1-092129, San Francisco, USA, May 4-8, 2009.
International Search Report issued by the International Search Authority for corresponding International patent application PCT/JP2015/061146, dated May 26, 2015.

* cited by examiner

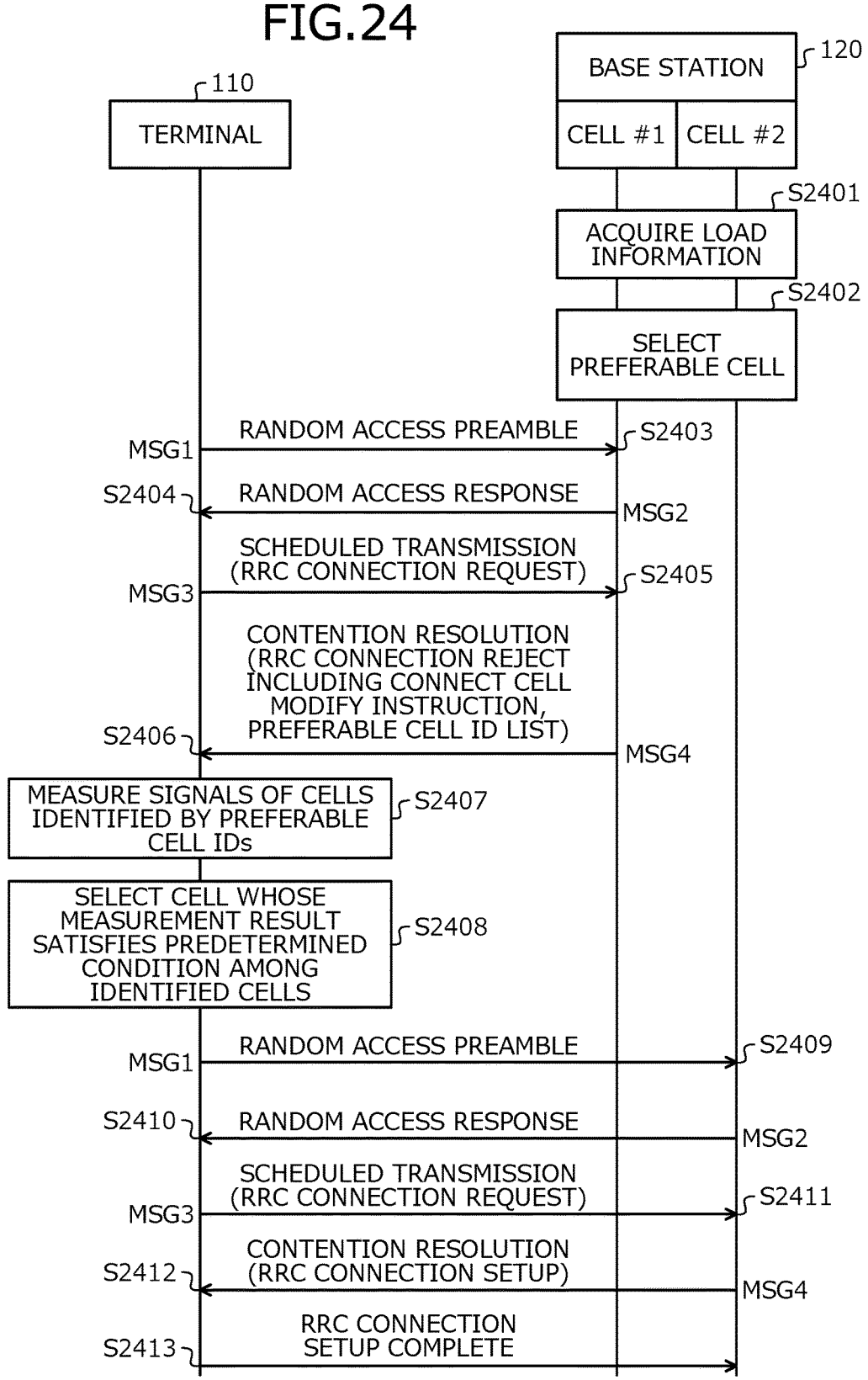

FIG.25

```
-- ASN1START

RRCConnectionReject ::=            SEQUENCE {
    criticalExtensions                 CHOICE {
        c1                                 CHOICE {
            rrcConnectionReject-r8         RRCConnectionReject-r8-IEs,
            spare3 NULL, spare2 NULL, spare1 NULL
        },
        criticalExtensionsFuture       SEQUENCE {}
    }
}

RRCConnectionReject-r8-IEs ::=     SEQUENCE {
    waitTime                           INTEGER (1..16),
    nonCriticalExtension               RRCConnectionReject-v8a0-IEs        OPTIONAL
    ConnectCellModify                  BOOLEAN,
    preferableCellIdList               PreferableCellIdList        OPTIONAL
}

RRCConnectionReject-v8a0-IEs ::= SEQUENCE {
    lateNonCriticalExtension           OCTET STRING                OPTIONAL,
    nonCriticalExtension               RRCConnectionReject-v1020-IEs       OPTIONAL
}

RRCConnectionReject-v1020-IEs ::=  SEQUENCE {
    extendedWaitTime-r10               INTEGER (1..1800)           OPTIONAL,
    -- Need ON
    nonCriticalExtension               RRCConnectionReject-v1130-IEs       OPTIONAL
}

RRCConnectionReject-v1130-IEs ::=  SEQUENCE {
    deprioritisationReq-r11            SEQUENCE {
        deprioritisationType-r11           ENUMERATED {frequency, e-utra},
        deprioritisationTimer-r11          ENUMERATED {min5, min10, min15, min30}
    }                                                              OPTIONAL,
    -- Need ON
    nonCriticalExtension               SEQUENCE {}                 OPTIONAL
}

PreferableCellIdList ::=           SEQUENCE (SIZE (1..maxPrefCellId)) OF preferableCellId preferableCellId                   PhysCellId

-- ASN1STOP
```

-- ASN1START

RRCConnectionReject ::=              SEQUENCE {
    criticalExtensions                   CHOICE {
        c1                                   CHOICE {
            rrcConnectionReject-r8               RRCConnectionReject-r8-IEs,
            spare3 NULL, spare2 NULL, spare1 NULL
        },
        criticalExtensionsFuture             SEQUENCE {}
    }
}

RRCConnectionReject-r8-IEs ::=       SEQUENCE {
    waitTime                             INTEGER (1..16),
    nonCriticalExtension                 RRCConnectionReject-v8a0-IEs        OPTIONAL
}

RRCConnectionReject-v8a0-IEs ::= SEQUENCE {
    lateNonCriticalExtension             OCTET STRING                        OPTIONAL,
    nonCriticalExtension                 RRCConnectionReject-v1020-IEs       OPTIONAL
}

RRCConnectionReject-v1020-IEs ::=    SEQUENCE {
    extendedWaitTime-r10                 INTEGER (1..1800)                   OPTIONAL,
    -- Need ON
    nonCriticalExtension                 RRCConnectionReject-v1130-IEs       OPTIONAL
}

RRCConnectionReject-v1130-IEs ::=    SEQUENCE {
    deprioritisationReq-r11              SEQUENCE {
        deprioritisationType-r11             ENUMERATED {frequency, e-utra},
        deprioritisationTimer-r11            ENUMERATED {min5, min10, min15, min30}
    }                                                                        OPTIONAL,
    -- Need ON
    nonCriticalExtension                 RRCConnectionReject-v13xy-IEs       OPTIONAL
}                                                                    2603

RRCConnectionReject-v13xy-IEs ::=    SEQUENCE {
    ConnectCellModify                    BOOLEAN,
    preferableCellIdList                 PreferableCellIdList                OPTIONAL,
    nonCriticalExtension                 SEQUENCE {}                         OPTIONAL
}

PreferableCellIdList ::=             SEQUENCE (SIZE (1..maxPrefCellId)) OF preferableCellId preferableCellId                     PhysCellId

-- ASN1STOP
```

2601 → (RRCConnectionReject-v1130-IEs closing)
2602 → (RRCConnectionReject-v13xy-IEs block)
2603 → (nonCriticalExtension RRCConnectionReject-v13xy-IEs)

FIG.28

```
-- ASN1START

RRCConnectionSetup ::=              SEQUENCE {
    rrc-TransactionIdentifier          RRC-TransactionIdentifier,
    ConnectCellModify                  BOOLEAN,                              OPTIONAL
    preferableCellIdList               PreferableCellIdList                  OPTIONAL
    criticalExtensions                 CHOICE {
        c1                                 CHOICE {
            rrcConnectionSetup-r8              RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture       SEQUENCE {}
    }
}

RRCConnectionSetup-r8-IEs ::=       SEQUENCE {
    radioResourceConfigDedicated       RadioResourceConfigDedicated,
    nonCriticalExtension               RRCConnectionSetup-v8a0-IEs           OPTIONAL
}

RRCConnectionSetup-v8a0-IEs ::= SEQUENCE {
    lateNonCriticalExtension           OCTET STRING                          OPTIONAL,
    nonCriticalExtension               SEQUENCE {}                           OPTIONAL
}

PreferableCellIdList ::=            SEQUENCE (SIZE (1..maxPrefCellId)) OF preferableCellId preferableCellId                    PhysCellId

-- ASN1STOP
```

2801 points to ConnectCellModify line.
2802 points to PreferableCellIdList line.
2800 labels the overall box.

FIG.29

```
                                    ┌─2900
    -- ASN1START

RRCConnectionSetup ::=          SEQUENCE {
2901    rrc-TransactionIdentifier       RRC-TransactionIdentifier,
        ConnectCellModify               BOOLEAN,                         OPTIONAL
        criticalExtensions              CHOICE {
            c1                              CHOICE {
                rrcConnectionSetup-r8           RRCConnectionSetup-r8-IEs,
                spare7 NULL,
                spare6 NULL, spare5 NULL, spare4 NULL,
                spare3 NULL, spare2 NULL, spare1 NULL
            },
            criticalExtensionsFuture        SEQUENCE {}
        }
    }

RRCConnectionSetup-r8-IEs ::=   SEQUENCE {                   2902
        radioResourceConfigDedicated    RadioResourceConfigDedicated,
        nonCriticalExtension            RRCConnectionSetup-v8a0-IEs      OPTIONAL
    }

RRCConnectionSetup-v8a0-IEs ::= SEQUENCE {
        lateNonCriticalExtension        OCTET STRING                     OPTIONAL,
        nonCriticalExtension            SEQUENCE {}                      OPTIONAL
    }

-- ASN1STOP
```

FIG.31

```
-- ASN1START

RRCConnectionSetup ::=           SEQUENCE {
    rrc-TransactionIdentifier        RRC-TransactionIdentifier,
    criticalExtensions               CHOICE {
        c1                                  CHOICE {
            rrcConnectionSetup-r8                RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture         SEQUENCE {}
    }
}

RRCConnectionSetup-r8-IEs ::=    SEQUENCE {
    radioResourceConfigDedicated     RadioResourceConfigDedicated,
    nonCriticalExtension             RRCConnectionSetup-v8a0-IEs          OPTIONAL
}

RRCConnectionSetup-v8a0-IEs ::= SEQUENCE {
    lateNonCriticalExtension         OCTET STRING                         OPTIONAL,
    nonCriticalExtension             RRCConnectionSetup-v13xy-IEs
    OPTIONAL
}

RRCConnectionSetup-v13xy-IEs ::=    SEQUENCE {
    ConnectCellModify                    BOOLEAN,
    preferableCellIdList                 PreferableCellIdList             OPTIONAL,
    nonCriticalExtension                 SEQUENCE {}                      OPTIONAL
}

PreferableCellIdList ::=             SEQUENCE (SIZE (1..maxPrefCellId)) OF preferableCellId preferableCellId                     PhysCellId

-- ASN1STOP
```

WIRELESS COMMUNICATIONS SYSTEM USING RANDOM ACCESS PROCEDURE

CROSS REFERENCE TO RELATED APPLICATIONS

This application is a continuation application of International Application PCT/JP2015/061146, filed on Apr. 9, 2015, and designating the U.S., the entire contents of which are incorporated herein by reference.

FIELD

The embodiments discussed herein relate to a wireless communications system, a wireless apparatus, and a processing method.

BACKGROUND

Mobile communications such as long term evolution (LTE) and LTE-advanced (LTE-A) are known (see, e.g. 3GPP TS36.300 v12.1.0, March 2014; 3GPP TS36.211 v12.1.0, March 2014; 3GPP TS36.212 v12.0.0, December 2013; 3GPP TS36.213 v12.1.0, March 2014; 3GPP TS36.321 v12.0.0, December 2013; 3GPP TS36.322 v11.0.0, September 2012; 3GPP TS36.323 v11.2.0, March 2013; 3GPP TS36.331 v12.0.0, December 2013; and 3GPP TR36.842 v12.0.0, December 2013). In these mobile communications, a configuration is where a base station apparatus forms plural cells. A technique is also known in which a base station apparatus instructs a user terminal to perform switching to another cell depending on the load balance between all subordinate cells and conditions of the user terminal (see, e.g. Japanese Laid-Open Patent Publication No. 2008-92381).

SUMMARY

According to an aspect of an embodiment, a wireless communications system includes a first wireless apparatus; and a second wireless apparatus. In a case of receiving from the second wireless apparatus, a random access preamble in an initial access of the second wireless apparatus to a first cell of the first wireless apparatus, the first apparatus transmits a response signal for the random access preamble, the response signal including an instruction to change a connected cell to a cell different from the first cell. The second wireless apparatus transmits based on the instruction included in the response signal transmitted from the first wireless apparatus, a random access preamble in an initial access to a second cell different from the first cell.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 24 is a sequence diagram depicting details of the processing example 2 of the wireless communications system according to the second embodiment;

FIG. 25 is a diagram depicting an example of a RRC connection reject in the processing example 2 of the wireless communications system according to the second embodiment;

FIG. 26 is a diagram depicting another example of the RRC connection reject in the processing example 2 of the wireless communications system according to the second embodiment;

FIG. 28 is a diagram depicting an example of a RRC connection setup in the processing example 3 of the wireless communications system according to the second embodiment;

FIGS. 29 and 30 are diagrams depicting another example of the RRC connection setup in the processing example 3 of the wireless communications system according to the second embodiment; and FIG. 31 is a diagram depicting still another example of the RRC connection setup in the processing example 3 of the wireless communications system according to the second embodiment.

DESCRIPTION OF THE INVENTION

Embodiments of a wireless communications system, a wireless apparatus, and a processing method according to the present invention will be described in detail with reference to the accompanying drawings.

It is noted that with the prior arts described above, in some cases, load balancing between cells cannot be performed according to the statuses of the cells such as load statuses thereof.

Figure 1:
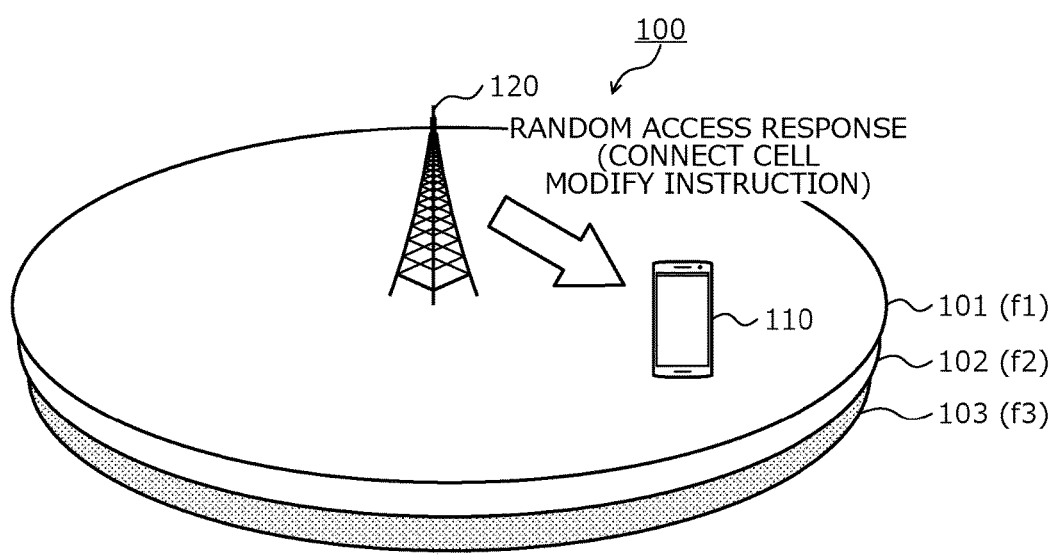
FIG. 1 is a diagram depicting an example of a wireless communications system according to a first embodiment.

FIG. 1 is a diagram depicting an example of a wireless communications system according to a first embodiment. As depicted in FIG. 1, a wireless communications system 100 according to the first embodiment includes a terminal 110 and a base station 120. The base station 120 is a first wireless apparatus accepting an initial access from the terminal 110 in accordance with a random access procedure. The terminal 110 is a second wireless apparatus making an initial access to the base station 120 in accordance with the random access procedure.

The terminal 110 is a terminal such as user equipment (UE) under LTE, for example. The base station 120 is a base station such as an eNB under LTE, for example. Cells 101 to 103 are cells formed by the base station 120. Frequencies of the cells 101 to 103 are frequencies f1 to f3 (f1≠f2≠f3), respectively. In the example depicted in FIG. 1, different frequencies represent different cells (frequency carriers).

In the random access procedure between the base station 120 and the terminal 110, the base station 120 stores a connect cell modify instruction in a random access response transmitted to the terminal 110. The random access response is a second message (message 2) in the random access procedure. The random access response is a response signal to a random access preamble from the terminal 110. The random access preamble is a first message (message 1) in the random access procedure.

The connect cell modify instruction is information instructing the terminal 110 to change a connection cell of the terminal 110 in accordance with the random access procedure. The connection cell is a cell to which the terminal 110 requests connection according to the random access procedure and is a transmission destination cell of the random access preamble from the terminal 110. For example, the base station 120 stores the connect cell modify instruction into the random access response, depending on the load status of the transmission destination cell of the random access preamble.

In cases where the connect cell modify instruction is included in the random access response received from the base station 120, the terminal 110 changes the connection cell and retransmits the random access preamble to the connection cell to which the terminal 110 changed. The connection cell to which the terminal 110 changed may be a cell of the base station 120 or a cell of a base station different from the base station 120.

In this manner, the base station 120 can cause the terminal 110 to change the connection cell, by storing the connect cell modify instruction into the random access response to the random access preamble from the terminal 110 depending on the load statuses of cells of the base station 120. Therefore, load balancing between cells depending on the load statuses of cells becomes possible.

The base station 120 may store into the random access response, an identifier of a change destination candidate cell of the connection cell together with the connect cell modify instruction. The change destination candidate cell of the connection cell is a cell to which the terminal 110 should preferably connect, and can be selected by the base station 120 depending on the load statues of the cells for example. Hereinafter, the change destination candidate cell of the connection cell stored in the random access response is referred to as a preferable cell, and an identifier of the preferable cell is referred to as a preferable cell ID. The preferable cell may be a cell of the base station 120 or a cell of a base station different from the base station 120.

The base station 120 may store into the random access response, plural preferable cell IDs indicating plural preferable cells together with the connect cell modify instruction. The plural preferable cells are cells included among the cells formed by the base station 120 for example. The plural preferable cells may include a cell (cells) formed by a base station different from the base station 120. That is, the plural preferable cells may include cells formed by plural base stations arranged at different locations. The plural preferable cells may include both cells formed by the base station 120 and cells formed by a base station different from the base station 120.

The plural preferable cells are cells having different frequencies from each other and including geographically overlapping portions. For example, the plural preferable cells may be cells having different frequencies from each other and having the same size or may be cells having different frequencies from each other and differing in size. The plural preferable cells may include a cell (cells) to which the terminal 110 cannot connect due to the terminal 110 not being present in the cell(s) or due to low communication quality of the terminal 110.

In the case of storing identifiers of plural preferable cells into the random access response, the base station 120 may configure the random access response as a signal including information that can specify the priorities of connection in the plural preferable cells. Information that can specify the priorities is, for example, information that includes identifiers of the plural preferable cells and information directly indicating the priorities of the plural preferable cells. Information directly indicating the priorities of the plural preferable cells is, for example, information indicating correspondences between identifiers of plural cells and priorities of the plural cells.

Alternatively, the information capable of specifying the priorities may be information in which identifiers of plural preferable cells are arranged in the order of priority of connection in the plural preferable cells. As a result, the terminal 110 can identify the priority based on the order of arrangement of the identifiers in the information included in the random access response, without the information directly indicating the priorities being stored in the random access response. Therefore, an increase in data size of the random access response can be suppressed. The order based on the priority may be an ascending order of the priority or a descending order thereof.

The random access response transmitted by the base station 120 is, for example, a random access response that includes information indicating a preferable cell selected based on the load statuses of candidate cells of the preferable cell, from among the candidate cells. The load statuses of cells for use in the selection of a preferable cell can be for example various statuses such as the usage rate of radio resources of a cell, the number of terminals currently connecting to a cell, and the retained amount (buffering amount) of data in a cell. The usage rate of radio resources can be the usage rate of a resource block (RB), for example.

Preferable-cell candidate cells are plural cells included in cells formed by the base station 120, for example. The preferable-cell candidate cells may include a cell (cells) formed by a base station different from the base station 120. The preferable-cell candidate cells are, for example, cells having different frequencies from each other and having geographically overlapping portions. The preferable-cell candidate cells may include a cell (cells) to which the terminal 110 cannot connect due to the terminal 110 not being present in the cell(s) or due to low communication quality of the terminal 110.

For example, in a case where the preferable-cell candidate cells include a cell (cells) formed by a base station different from the base station 120, the base station 120 receives from the different base station, information indicating the load status of the cell formed by the different base station. Based on the received information indicating the load status, the base station 120 selects from among the preferable-cell candidate cells, a preferable cell indicated by information stored in a random access response.

In a case where at least one of the preferable cells indicated by the preferable cell IDs included in the random access response satisfies a predetermined condition, the terminal 110 performs processing of connecting to the cell satisfying the predetermined condition among the preferable cells. If none of the preferable cells satisfies the predetermined condition, the terminal 110 performs processing of connecting to a cell different from the preferable cells, among cells to which the terminal 110 can connect.

The predetermined condition is, for example, a condition related to a communication quality of the terminal 110. The communication quality of the terminal 110 is, for example, a communication quality that can be calculated based on the result of reception of a cell's radio signal by the terminal 110. The communication quality can be, for example, reference signal reception power (RSRP), reference signal received quality (RSRQ), received signal strength indicator (RSSI), etc.

In this manner, by storing into the random access response, preferable cell IDs selected according to the cell load statuses, the base station 120 can connect the terminal 110 to a less-loaded cell so that the load balancing between cells can be performed. By storing plural preferable cell IDs selected depending on the cell load statuses into the random access response, the base station 120 can enhance the possibility of connection of the terminal 110 to a less-loaded cell and achieve the load balancing between cells.

The preferable cell ID may be an ID of a cell of a base station different from the base station 120 or of a remote radio head (RRH). This enables load balancing with surrounding cells to be performed. Application to a heterogeneous network (HetNet) also becomes possible.

The example depicted in FIG. 1 is an example in which a single base station 120 deploys plural cells (cells 101 to 103) by using plural frequency carriers. For example, the base station 120 acquires load information indicating load statuses of cells 101 to 103 that the base station 120 serves. Based on the acquired load information, the base station 120 determines a preferable cell from among the cells 101 to 103 and stores the ID (preferable cell ID) of the determined cell and a connect cell modify instruction into the random access response and transmits the random access response.

Figure 2:
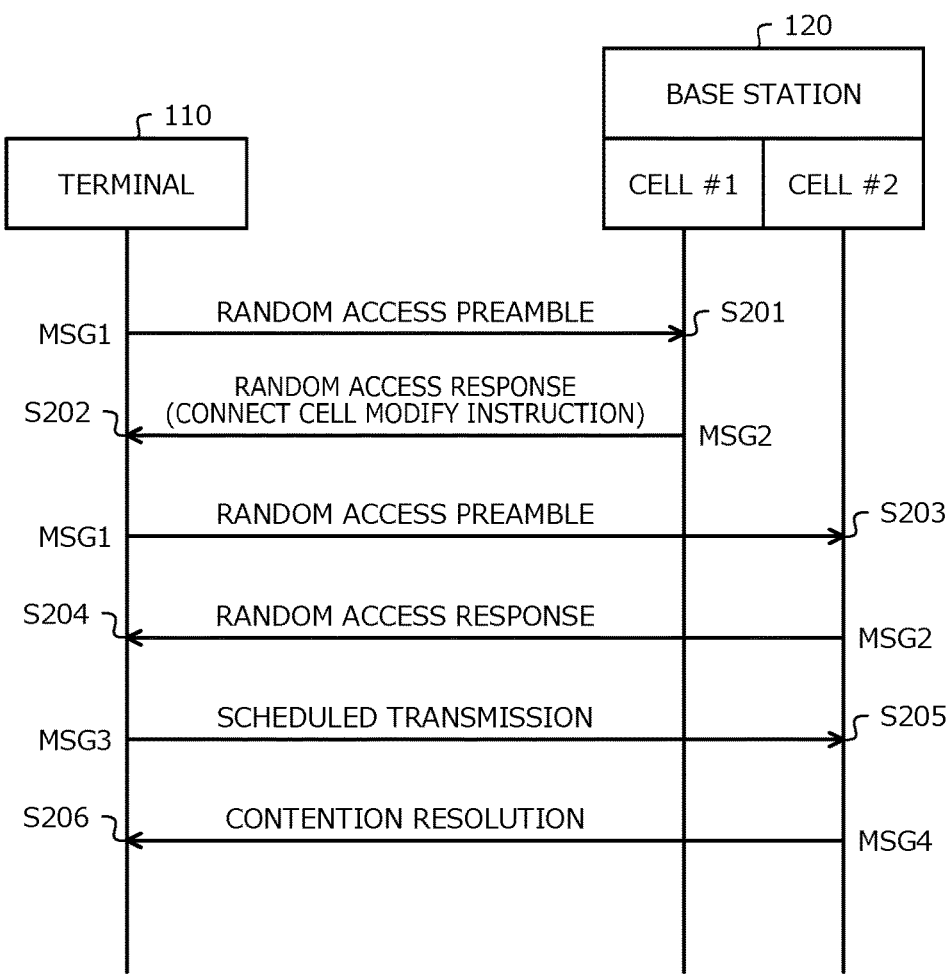
FIG. 2 is a sequence diagram depicting an example of processing in the wireless communications system according to the first embodiment.

FIG. 2 is a sequence diagram depicting an example of processing in the wireless communications system according to the first embodiment. In the wireless communications system 100 according to the first embodiment, steps depicted in FIG. 2, for example, are executed.

First, the terminal 110 selects a cell #1 of the base station 120 as a connection destination of an initial access and transmits a random access preamble as a message 1 (MSG1) in the random access procedure to the cell #1 of the base station 120 (step S201).

Next, the cell #1 of the base station 120 transmits to the terminal 110, a random access response as a message 2 (MSG2) in the random access procedure (step S202). In the example depicted in FIG. 2, the cell #1 of the base station 120 is assumed to store the connect cell modify instruction into the random access response transmitted at step S202. The terminal 110 is assumed to change the connected cell from the cell #1 to the cell #2 based on the connect cell modify instruction included in the random access response received at step S202.

Next, the terminal 110 transmits to the cell #2 of the base station 120, a random access preamble as the message 1 (MSG1) in the random access procedure (step S203). Next, the cell #2 of the base station 120 transmits to the terminal 110, a random access response as the message 2 (MSG2) in the random access procedure (step S204). In the example depicted in FIG. 2, the cell #2 of the base station 120 is assumed to not store a connect cell modify instruction into the random access response transmitted at step S204.

Next, the terminal 110 transmits to the cell #2 of the base station 120, a scheduled transmission as a message 3 (MSG3) in the random access procedure (step S205). Next, the cell #2 of the base station 120 transmits to the terminal 110, a contention resolution as a message 4 (MSG4) in the random access procedure (step S206), completing connection of the terminal 110 to the cell #2 of the base station 120.

In this manner, the base station 120 stores the connect cell modify instruction into the random access response in the random access procedure. As a result, the terminal 110 can change the connected cell at an early stage in the initial access of the terminal 110.

Figure 3:
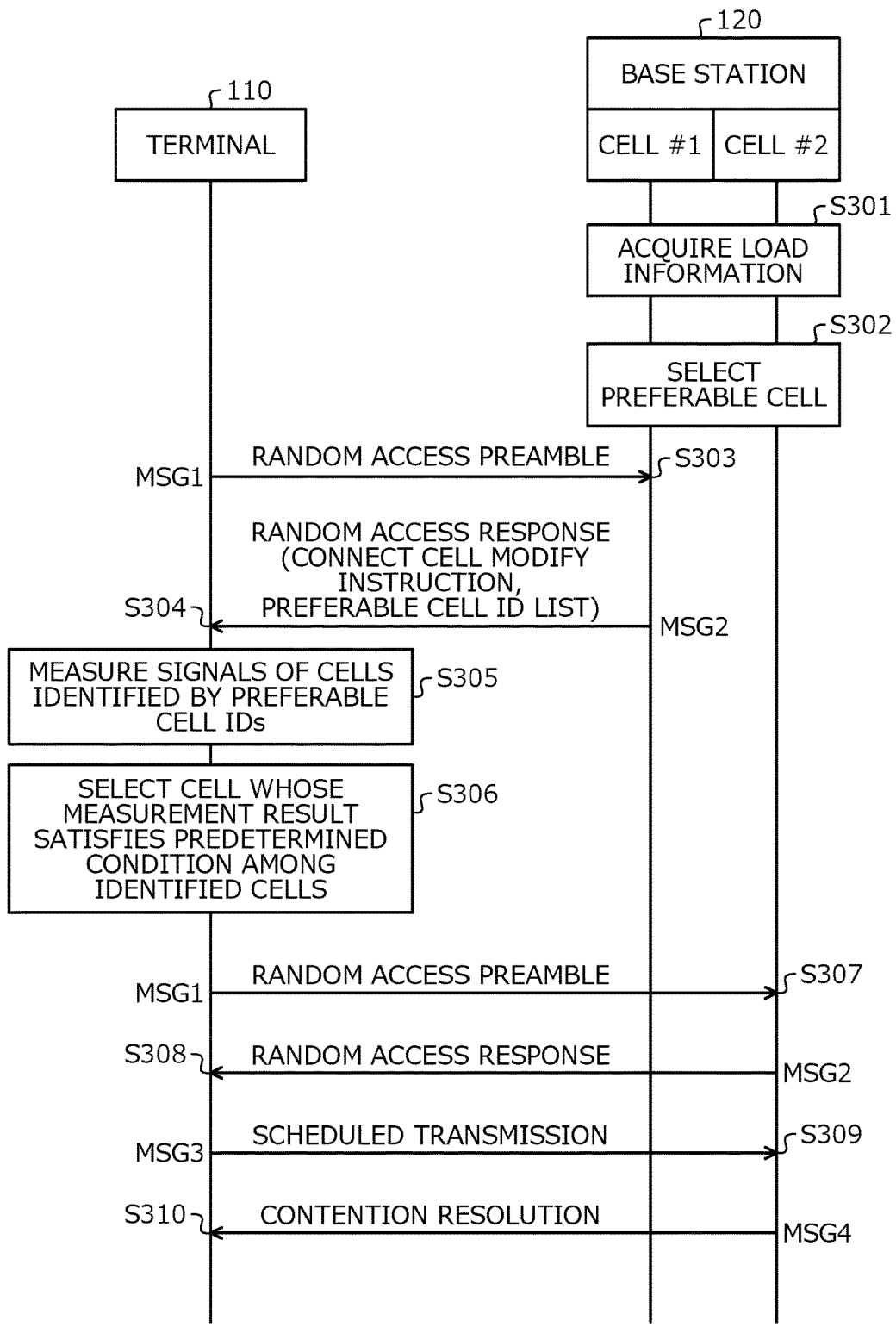
FIG. 3 is a sequence diagram depicting a more detailed example of processing in the wireless communications system according to the first embodiment.

FIG. 3 is a sequence diagram depicting a more detailed example of processing in the wireless communications system according to the first embodiment. First, the base station 120 acquires load information indicating the load status of each subordinate cell (e.g., cells #1 and #2) of the base station 120 (step S301). Next, the base station 120 selects a preferable cell based on the load information acquired at step S301 (step S302). The preferable cell is a connection cell candidate to which connection of the terminal 110 requesting connection from the base station 120 is preferable. The preferable cell is not limited to cells of the base station 120 and may include cells of a base station neighboring the base station 120.

The timing at which the base station 120 executes steps S301 and S302 is optional. For example, the base station 120 performs steps S301 and S302 periodically. Alternatively, the base station 120 may perform step S301 periodically and may perform step S302 in cases where a change in the load status is detected at step S301. Since the change in the load status occurs due to an increase or decrease in number of the terminals in a connected state (connected terminals), the base station 120 may perform steps S301 and S302 in response to a change in number of connected terminals in each of the cells of the base station 120.

Next, the terminal 110 selects the cell #1 of the base station 120 as the connection destination and transmits to the cell #1 of the base station 120, a random access preamble as the message 1 (MSG1) in the random access procedure (step S303).

Next, the cell #1 of the base station 120 transmits to the terminal 110, a random access response as the message 2 (MSG2) in the random access procedure (step S304). In the example depicted in FIG. 3, the cell #1 of the base station 120 stores a connect cell modify instruction and a preferable cell ID list into the random access response transmitted at step S304. The preferable cell ID list is a list of preferable cells selected at step S302, for example.

Next, the terminal 110 measures signals of cells identified by the preferable cell IDs, based on the connect cell modify instruction and the preferable cell ID list included in the random access response received at step S304 (step S305). For example, the terminal 110 measures reception power thereat of the signals of the cells identified by the preferable cell IDs.

Next, the terminal 110 selects a cell whose measurement result at step S305 satisfies a predetermined condition among the cells identified by the preferable cell IDs (step S306). For example, the terminal 110 selects a cell whose reception power measured at step S305 is equal to or greater than a threshold value and whose priority is highest, among the cells identified by the preferable cell IDs.

In a case where no cell whose measurement result satisfies the predetermined condition is present at step S306, the terminal 110 may select an arbitrary cell, for example, and transmit a random access preamble to the selected cell. This arbitrary cell may be the cell #1 to which the terminal 110 has transmitted the random access preamble at step S303.

In the example depicted in FIG. 3, the terminal 110 is assumed to select the cell #2 of the base station 120 at step S306. Next, the terminal 110 transmits to the cell #2 of the base station 120 selected at step S306, a random access preamble as the message 1 (MSG1) in the random access procedure (step S307). Steps S308 to S310 depicted in FIG. 3 are similar to steps S204 to S206 depicted in FIG. 2.

In this manner, the base station 120 stores the connect cell modify instruction and the preferable cell ID list into the random access response in the random access procedure. As a result, the terminal 110 can change the connected cell at an early stage in the initial access of the terminal 110. By transmitting the preferable cell ID list selected based on the load information to the terminal 110, the terminal 110 can change the connected cell to a less loaded cell.

The base station 120 may select cells (a cell) having a frequency closer (e.g., closest) to that of the current connected cell #1 of the terminal 110, among the preferable cells selected at step S302, and store IDs (an ID) of the selected cells (cell) into the preferable cell ID list. This can enhance the possibility that the radio quality of the changed connected cell may satisfy the requirements for connection. The probability of an occurrence of a case in which a random access preamble transmitted from the terminal 110 to a changed connected cell does not arrive at the changed connected cell can be reduced.

In this manner, the base station 120 may store, as the preferable cell IDs, into the random access response, IDs of cells different from the cell #1, selected according to the difference in frequency from that of the cell #1 among the preferable cells (connection candidate cells). As a result, the probability of failure in the connection of the terminal 110 to a cell indicated by the preferable cell ID can be reduced and thereby, suppress increases in the processing amount of the apparatuses and in the amount of signaling.

Figure 4:
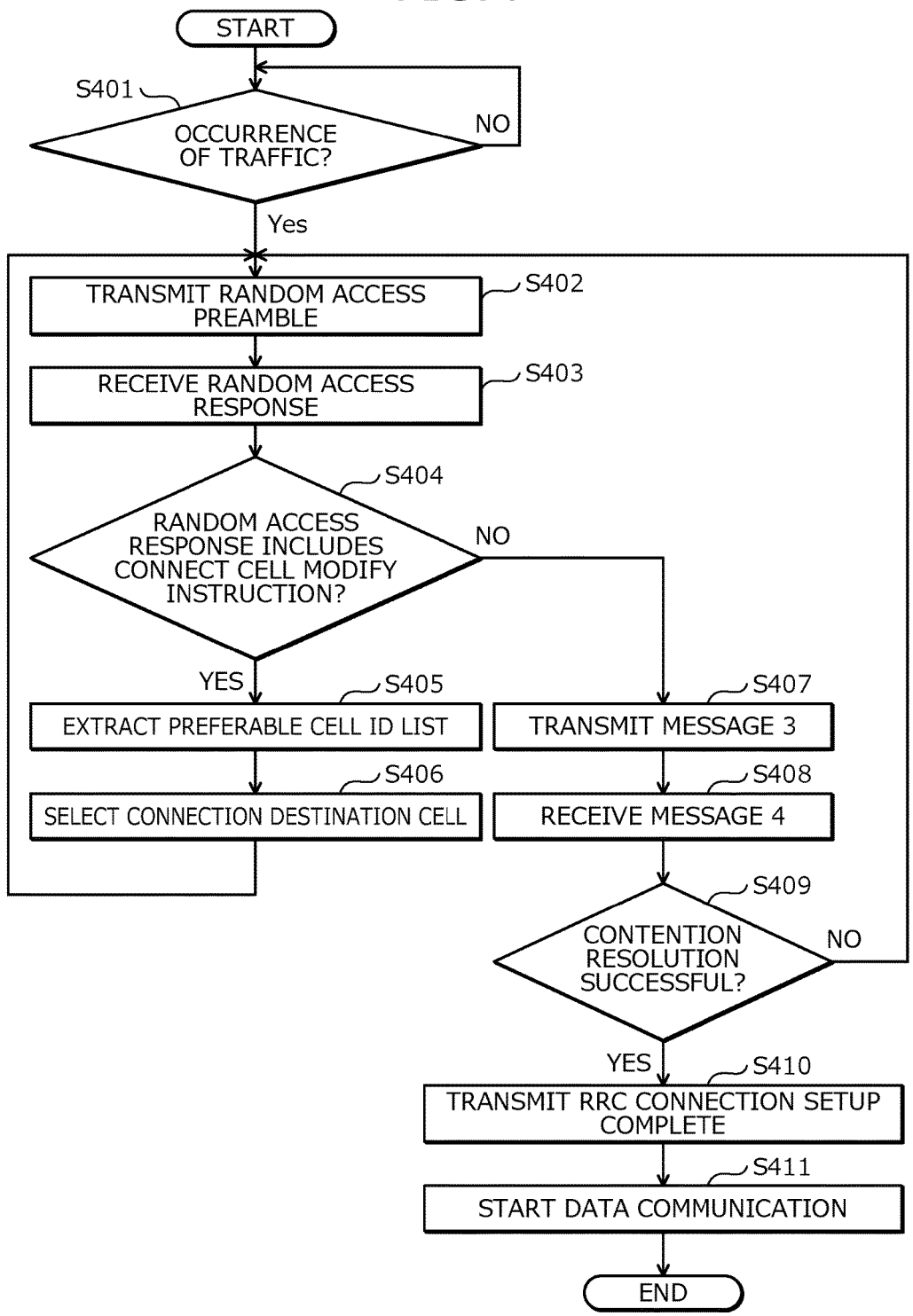
FIG. 4 is a flowchart depicting an example of processing by a terminal according to the first embodiment.

FIG. 4 is a flowchart depicting an example of processing by the terminal according to the first embodiment. The terminal 110 according to the first embodiment executes steps depicted in FIG. 4, for example. First, the terminal 110 determines whether traffic has occurred (step S401), and waits until traffic occurs (step S401: NO).

When the traffic occurs at step S401 (step S401: YES), the terminal 110 transmits a random access preamble to the base station 120 (step S402). At the initial execution of step S402, the terminal 110 transmits a random access preamble to an arbitrarily selected cell. When transitioning from step S406 to step S402, at step S402, the terminal 110 transmits a random access preamble to a cell selected at step S406. When transitioning from step S409 to step S402, the terminal 110 transmits a random access preamble to an arbitrarily selected cell.

Next, the terminal 110 receives from the base station 120, a random access response to the random access preamble transmitted at step S402 (step S403). The terminal 110 then determines whether a connect cell modify instruction is included in the random access response received at step S403 (step S404).

In a case where a connect cell modify instruction is included at step S404 (step S404: YES), the terminal 110 extracts a preferable cell ID list from the random access response received at step S403 (step S405). The terminal 110 then selects a connection cell from among cells indicated by the preferable cell ID list extracted at step S405 (step S406), and returns to step S402.

In a case where a connect cell modify instruction is not included in the random access response at step S404 (step S404: NO), the terminal 110 transmits to the base station 120, the message 3 in the random access procedure (step S407). The message 3 is, for example, a scheduled transmission and includes a radio resource control connection request (RRC connection request). The message 3 may include an SAE temporary mobile subscriber identity (S-TMSI) or a random ID of the terminal 110.

The terminal 110 then receives a message 4 from the base station 120 in response to the message 3 transmitted at step S407 (step S408). The message 4 includes, for example, the contention resolution and information indicating whether the RRC connection is possible. The information indicating whether the RRC connection is possible includes an RRC connection setup indicating that the RRC connection is possible or an RRC connection reject indicating that the RRC connection is not possible.

The terminal 110 then determines whether the contention resolution is successful, based on the message 4 received at step S408 (step S409). For example, the terminal 110 can make a determination at step S409, according to whether the TMSI or the random ID of the terminal 110 stored in the message 3 transmitted at step S407 is included in the message 4 received at step S408.

In a case where the contention resolution is not successful at step S409 (step S409: NO), the terminal 110 returns to step S402. In a case where the contention resolution is successful (step S409: YES), the terminal 110 transmits to the base station 120, an RRC connection setup complete indicating that the setup of the RRC connection has been completed (step S410). The terminal then starts data communication with the base station 120 (step S411), and terminates the series of operations for the initial access.

Figure 5:
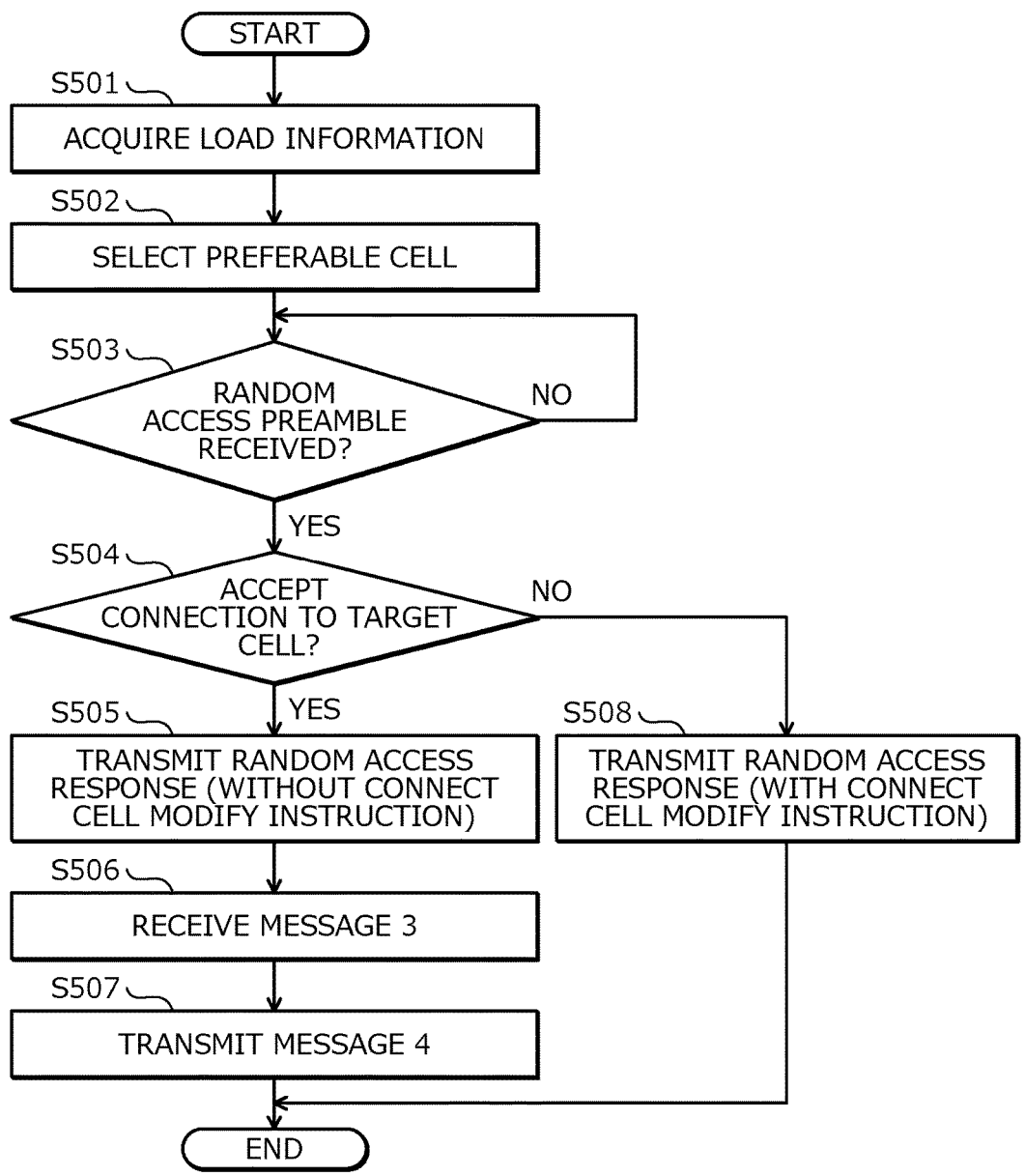
FIG. 5 is a flowchart depicting an example of processing by a base station according to the first embodiment.

FIG. 5 is a flowchart depicting an example of processing by the base station according to the first embodiment. The base station 120 according to the first embodiment executes steps depicted in FIG. 5, for example. Steps S501 and S502 depicted in FIG. 5 are similar to S301 and S302 depicted in FIG. 3. Subsequent to step S502, the base station 120 determines whether the base station 120 has received a random access preamble from the terminal 110 (step S503) and waits until a random access preamble is received (step S503: NO).

When a random access preamble is received at step S503 (step S503: YES), the base station 120 determines whether to accept a connection to a target cell of the received random access preamble (step S504). The determination at step S504 can be made based on the load information acquired at step S501, for example.

In a case of accepting the connection at step S504 (step S504: YES), the base station 120 transmits a random access response without a connect cell modify instruction to the terminal 110 (step S505). The base station 120 then receives from the terminal 110, the message 3 in the random access procedure (step S506). The base station 120 transmits to the terminal 110, the message 4 in the random access procedure (step S507), and terminates the series of operations.

In a case of not accepting the connection at step S504 (step S504: NO), the base station 120 transmits a random access response with a connect cell modify instruction to the terminal 110 (step S508), and terminates the series of operations. Although in this case the terminal 110 changes the connected cell and retransmits a random access preamble, the base station 120 again performs operations at and subsequent to step S503 in a case where the changed connected cell is a cell of the base station 120.

In this manner, the base station 120 determines whether to accept a connection, based on the load status of the cell that is the transmission destination of the random access preamble when receiving a random access preamble from the terminal 110. When determining not to accept a connection, the base station 120 transmits a random access response with a connect cell modify instruction to the terminal 110. This enables the load balancing between cells to be performed according to the load statuses of cells.

Figure 6:
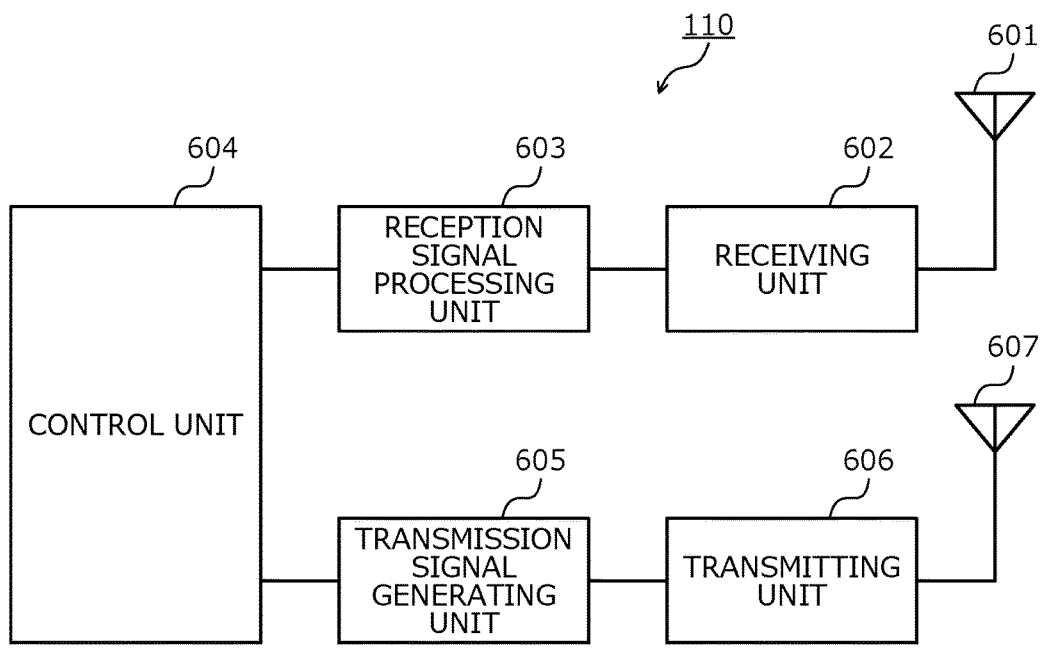
FIG. 6 is a diagram depicting an example of the terminal according to the first embodiment.

FIG. 6 is a diagram depicting an example of the terminal according to the first embodiment. As depicted in FIG. 6, the terminal 110 according to the first embodiment includes, for example, a receiving antenna 601, a receiving unit 602, a reception signal processing unit 603, a control unit 604, a transmission signal generating unit 605, a transmitting unit 606, and a transmitting antenna 607.

The receiving antenna 601 receives a signal wirelessly transmitted from the base station 120 and outputs the received signal to the receiving unit 602. The receiving unit 602 performs reception processing of the signal output from the receiving antenna 601. The reception processing by the receiving unit 602 includes, for example, amplification, frequency conversion from a radio frequency (RF) band to a baseband, and conversion from an analog signal to a digital signal. The receiving unit 602 outputs the reception-processed signal to the reception signal processing unit 603.

The reception signal processing unit 603 performs processing such as demodulation or decoding for the signal output from the receiving unit 602. The reception signal processing unit 603 outputs the signal obtained by the processing such as demodulation or decoding to the control unit 604.

The control unit 604 controls communications in the terminal 110. For example, the control unit 604 controls the transmission signal generating unit 605 to perform a procedure of random access to the base station 120. The control unit 604 acquires messages, such as the message 2 and the message 4 in the random access procedure, included in the signal output from the reception signal processing unit 603. The control unit 604 then changes the connected cell in the random access procedure, based on the connect cell modify instruction and the preferable cell ID list included in the acquired message.

Based on control from the control unit 604, the transmission signal generating unit 605 generates a signal to be transmitted from the terminal 110. For example, the transmission signal generating unit 605 encodes a signal output from the control unit 604 and performs modulation based on the encoded signal, to thereby generate a signal to be transmitted. Examples of the signal generated by the transmission signal generating unit 605 include the message 1 and the message 3 in the random access procedure. The transmission signal generating unit 605 outputs the generated signal to the transmitting unit 606.

The transmitting unit 606 performs transmission processing of the signal output from the transmission signal generating unit 605 and outputs the transmission-processed signal to the transmitting antenna 607. Examples of the transmission processing by the transmitting unit 606 include conversion from a digital signal to an analog signal, frequency conversion from a baseband to a RF band, and amplification. The transmitting antenna 607 wirelessly transmits to the base station 120, the signal output from the transmitting unit 606.

In the terminal 110, the transmitting unit that transmits a random access preamble to the base station 120 can be implemented by the transmission signal generating unit 605, the transmitting unit 606, and the transmitting antenna 607. In the terminal 110, the receiving unit that receives a response signal (random access response) to the random access preamble from the base station 120 can be implemented by the receiving antenna 601, the receiving unit 602, and the reception signal processing unit 603.

Figure 7:
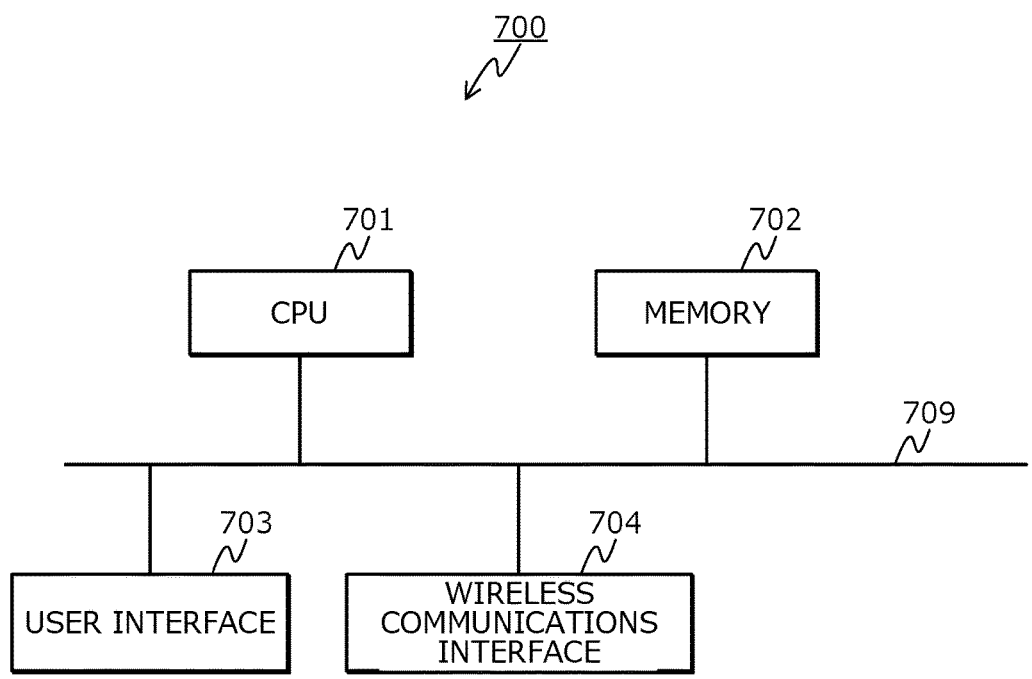
FIG. 7 is a diagram depicting an example of a hardware configuration of the terminal according to the first embodiment.

FIG. 7 is a diagram depicting an example of a hardware configuration of the terminal according to the first embodiment. The terminal 110 depicted in FIG. 6 can be implemented by a communication apparatus 700 depicted in FIG. 7, for example. The communication apparatus 700 includes a central processing unit (CPU) 701, a memory 702, a user interface 703, and a wireless communications interface 704. The CPU 701, the memory 702, the user interface 703, and the wireless communications interface 704 are connected to each other via bus 709.

The CPU 701 provides overall control of the communication apparatus 700. The memory 702 includes, for example, a main memory and an auxiliary memory. The main memory is a random access memory (RAM), for example. The main memory is used as a work area of the CPU 701. The auxiliary memory is a non-volatile memory such as a magnetic disk and a flash memory. The auxiliary memory stores various programs for operating the communication apparatus 700. The programs stored in the auxiliary memory are loaded onto the main memory and run by the CPU 701.

The user interface 703 includes, for example, an input device that accepts operation input from the user and an output device that outputs information to the user. The input device can be implemented by a key (e.g., keyboard) or a remote controller, for example. The output device can be implemented by a display or a speaker, for example. The input device and the output device may be implemented by a touch panel, etc. The user interface 703 is controlled by the CPU 701.

The wireless communications interface 704 is a communication interface performing wireless communication with an external apparatus (e.g., base station 120 or other terminal) of the communication apparatus 700. The wireless communications interface 704 is controlled by the CPU 701.

The receiving antenna 601, the receiving unit 602, the transmitting unit 606, and the transmitting antenna 607 depicted in FIG. 6 can be implemented by the wireless communications interface 704, for example. The reception signal processing unit 603, the control unit 604, and the transmission signal generating unit 605 depicted in FIG. 6 can be implemented by the CPU 701, for example.

Figure 8:
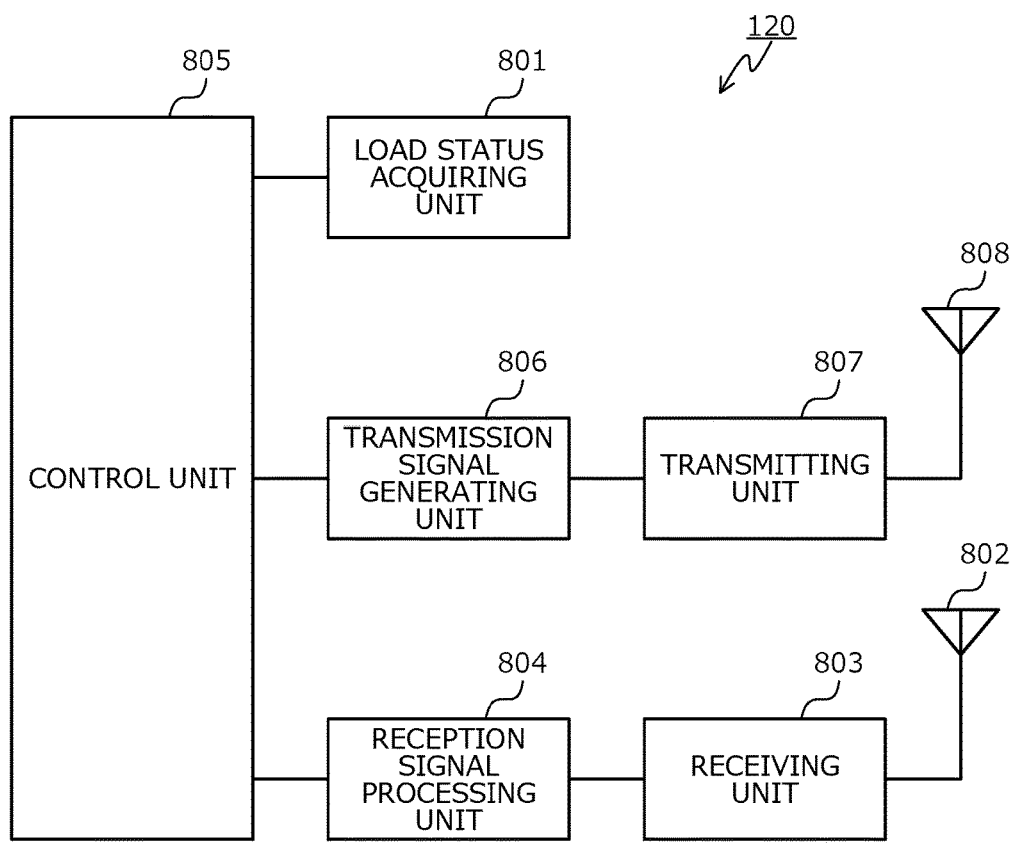
FIG. 8 is a diagram depicting an example of a base station according to the first embodiment.

FIG. 8 is a diagram depicting an example of the base station according to the first embodiment. As depicted in FIG. 8, the base station 120 according to the first embodiment includes a load status acquiring unit 801, a receiving antenna 802, a receiving unit 803, a reception signal processing unit 804, a control unit 805, a transmission signal generating unit 806, a transmitting unit 807, and a transmitting antenna 808.

The load status acquiring unit 801 acquires load information indicating the load status of each cell of the base station 120. The load information is various types of information indicating the load status of a cell. For example, the load status acquiring unit 801 can acquire load information of cells of the base station 120, based on scheduling processing of the base station 120, for example. The load status acquiring unit 801 can acquire from another base station, load information on cells of the other base station, via an inter-base-station interface. The inter-base-station interface can be, for example, an X2 interface. The load status acquiring unit 801 outputs the acquired load information to the control unit 805.

The receiving antenna 802 receives a signal transmitted wirelessly from the terminal 110 and outputs the received signal to the receiving unit 803. The receiving unit 803 performs reception processing of the signal output from the receiving antenna 802. Examples of the reception processing by the receiving unit 803 include amplification, frequency conversion from a RF band to a baseband, and conversion from an analog signal to a digital signal. The receiving unit 803 outputs the reception-processed signal to the reception signal processing unit 804.

The reception signal processing unit 804 performs processing such as demodulation or decoding for the signal output from the receiving unit 803. The reception signal processing unit 804 then outputs the demodulated or decoded signal to the control unit 805.

The control unit 805 controls communication in the base station 120. For example, the control unit 805 selects a preferable cell, based on the load information output from the load status acquiring unit 801. In a case where a random access preamble is received from the terminal 110, the control unit 805 determines whether to accept a connection from the terminal 110, based on the load information.

In response to messages in the random access procedure included in the signal output from the reception signal processing unit 804, the control unit 805 controls the transmission signal generating unit 806 to transmit response messages. In a case of connection from the terminal 110 in response to the random access preamble from the terminal 110, the control unit 805 stores a connect cell modify instruction and a preferable cell ID list into a random access response to the random access preamble.

The transmission signal generating unit 806 generates, under control from the control unit 805, a signal to be transmitted by the base station 120. For example, the transmission signal generating unit 806 encodes a signal output from the control unit 805 and performs modulation based on the encoded signal, to thereby generate a signal to be transmitted. Examples of the signal generated by the transmission signal generating unit 806 include the message 2 and the message 4 in the random access procedure. The transmission signal generating unit 806 outputs the generated signal to the transmitting unit 807.

The transmitting unit 807 performs transmission processing of the signal output from the transmission signal generating unit 806. Examples of the transmission processing by the transmitting unit 807 include conversion from a digital signal to an analog signal, frequency conversion from a baseband to a RF band, and amplification. The transmitting unit 807 outputs the transmission-processed signal to the transmitting antenna 808. The transmitting antenna 808 transmits by radio the signal output from the transmitting unit 807, to the terminal 110.

In the base station 120, the receiving unit that receives a random access preamble from the terminal 110 can be implemented by the receiving antenna 802, the receiving unit 803, and the reception signal processing unit 804. In the base station 120, the transmitting unit that transmits a response signal (random access response) to a random access preamble can be implemented by the transmission signal generating unit 806, the transmitting unit 807, and the transmitting antenna 808.

Figure 9:
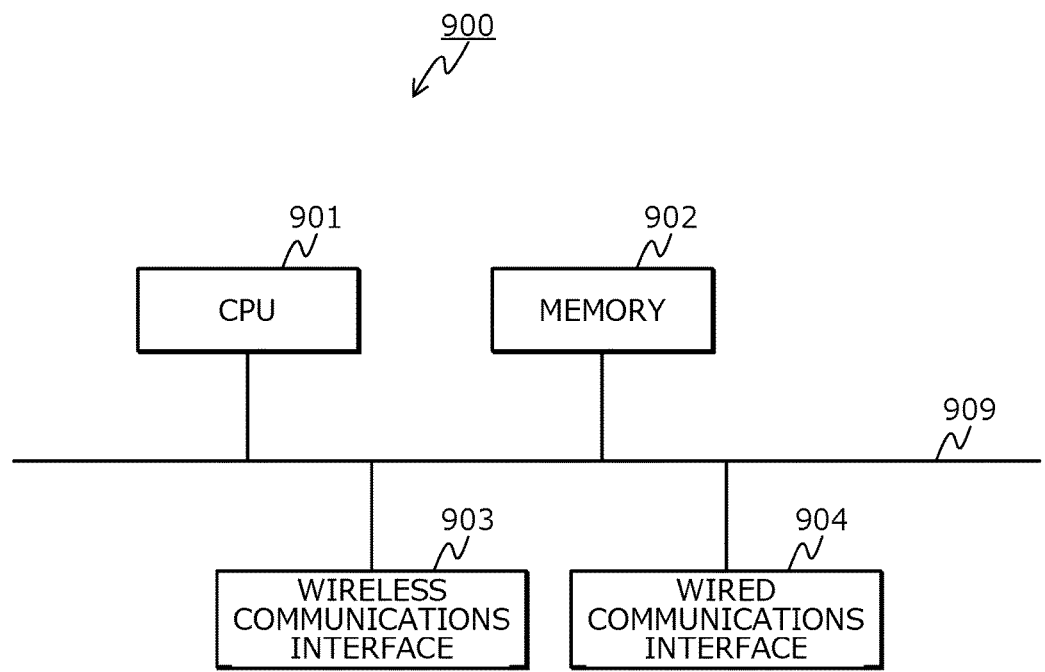
FIG. 9 is a diagram depicting an example of a hardware configuration of the base station according to the first embodiment.

FIG. 9 is a diagram depicting an example of a hardware configuration of the base station according to the first embodiment. The base station 120 depicted in FIG. 8 can be implemented by a communication apparatus 900 depicted in FIG. 9 for example. The communication apparatus 900 includes a CPU 901, a memory 902, a wireless communications interface 903, and a wired communications interface 904. The CPU 901, the memory 902, the wireless communications interface 903, and the wired communications interface 904 are connected to each other via bus 909.

The CPU 901 provides overall control of the communication apparatus 900. The memory 902 includes, for example, a main memory and an auxiliary memory. The main memory is a RAM, for example. The main memory is used as a work area of the CPU 901. The auxiliary memory is, for example, a non-volatile memory such as a magnetic disk, an optical disk, and a flash memory. The auxiliary memory stores various programs for operating the communication apparatus 900. The programs stored in the auxiliary memory are loaded onto the main memory and run by the CPU 901.

The wireless communications interface 903 is a communication interface performing wireless communication with the exterior (e.g., terminal 110) of the communication apparatus 900. The wireless communications interface 903 is controlled by the CPU 901.

The wired communications interface 904 is a communication interface performing wired communication with an external apparatus (e.g., an upper station of the base station 120 or another base station) of the communication apparatus 900. The wired communications interface 904 is controlled by the CPU 901. Examples of the wired communications interface 904 include an S1 interface and the X2 interface.

The load status acquiring unit 801 depicted in FIG. 8 can be implemented by the CPU 901 or the wired communications interface 904, for example. The reception signal processing unit 804, the control unit 805, and the transmission signal generating unit 806 depicted in FIG. 8 can be implemented by the CPU 901, for example. The transmitting unit 807, the transmitting antenna 808, the receiving antenna 802, and the receiving unit 803 depicted in FIG. 8 can be implemented by the wireless communications interface 903, for example.

Figure 10:
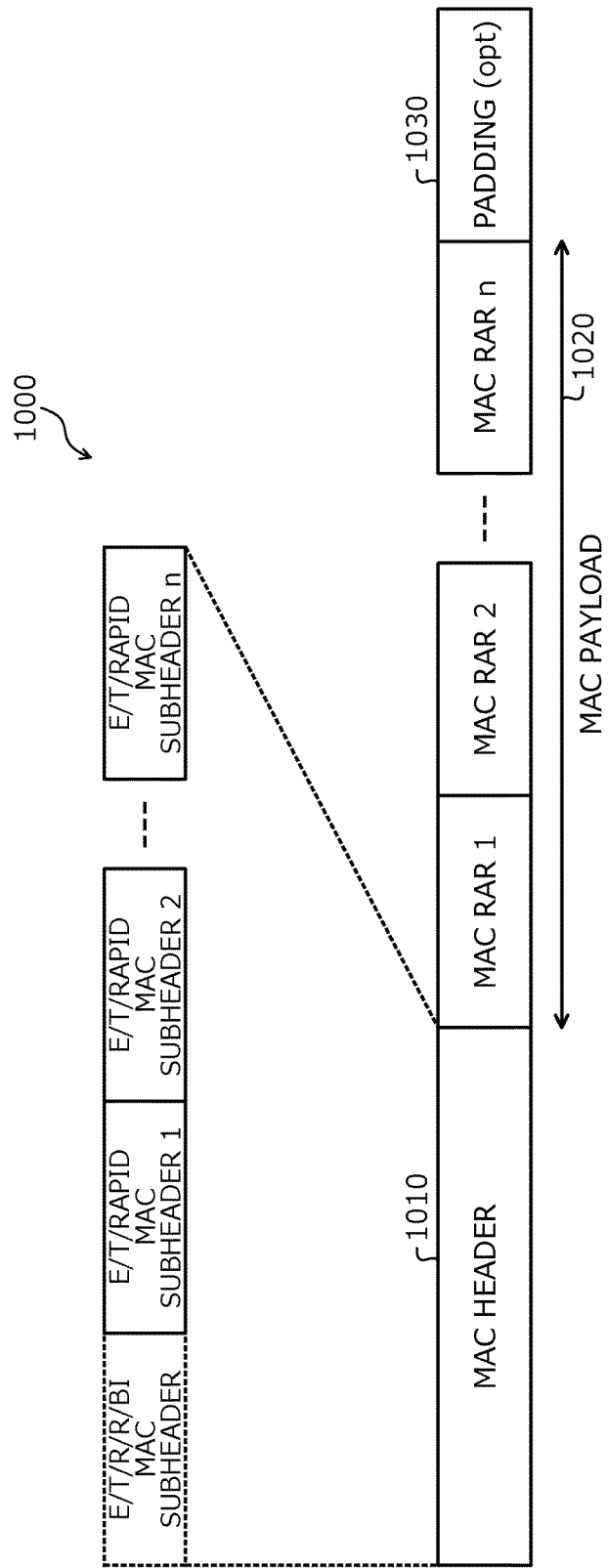
FIGS. 10 and 11 are diagrams depicting a storage example 1 of storage of a connect cell modify instruction into a random access response in the first embodiment.
Figure 11:
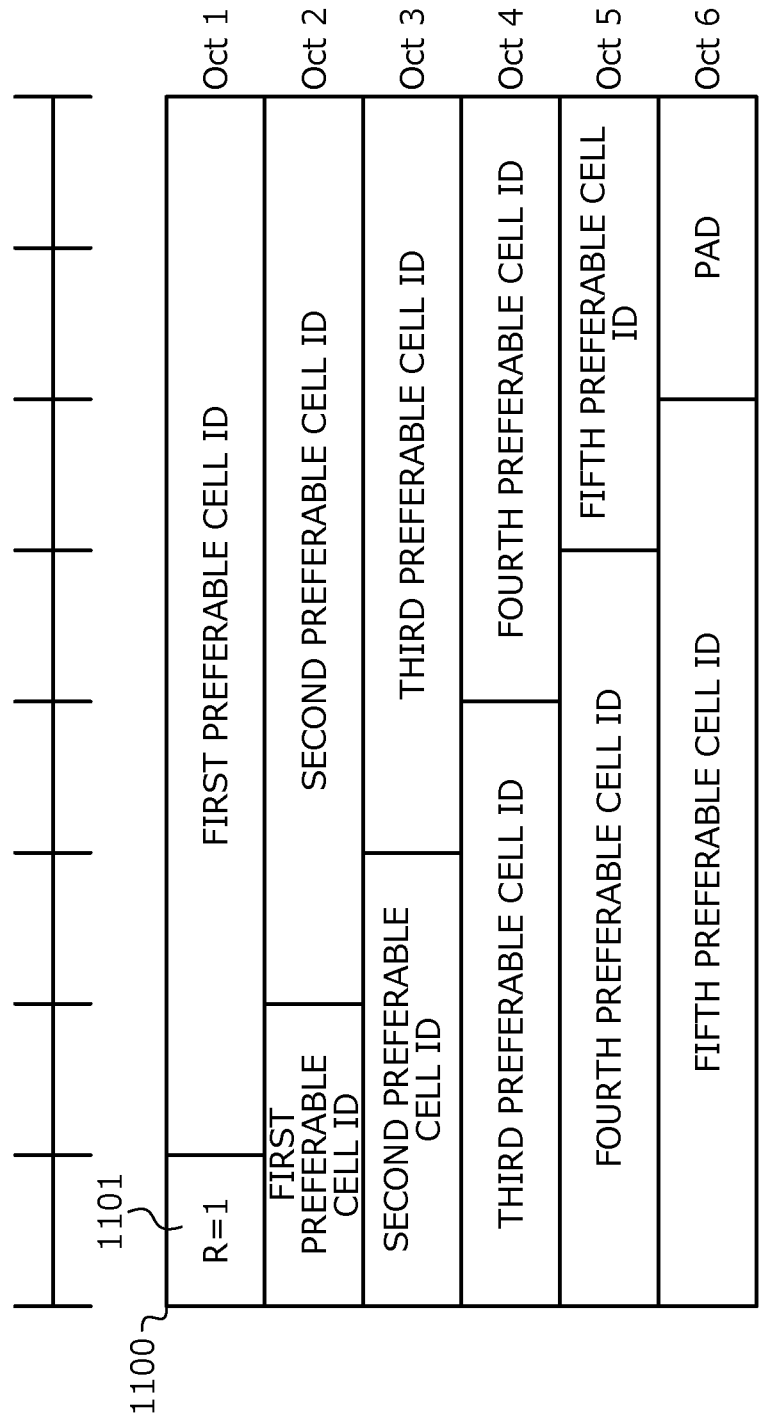

FIGS. 10 and 11 are diagrams depicting a storage example 1 of storage of a connect cell modify instruction into a random access response in the first embodiment. At step S304 depicted in FIG. 3, for example, the base station 120 transmits a random access response 1000 depicted in FIG. 10 as the random access response to the terminal 110. The random access response 1000 includes a MAC header 1010, a MAC payload 1020, and padding 1030.

The MAC payload 1020 includes n MAC random access responses (MAC RAR1 to MAC RARn). The n MAC random access responses are random access responses to random access preambles received by the base station 120 at around the same time.

A MAC random access response 1100 depicted in FIG. 11 is a MAC random access response included in the MAC RAR1 to MAC RARn included in the MAC payload 1020. An R-bit 1101 is a reserved bit included in the MAC random access response 1100. 3GPP describes that the R-bit 1101 is set to "0".

The base station 120 stores the R-bit 1101="1", for example, as the connect cell modify instruction into the MAC random access response 1100. In particular, in a case of not instructing the terminal 110 to change the connection cell, the base station 120 transmits the random access response 1000 including the MAC random access response 1100 with the R-bit 1101="0" to the terminal 110.

In a case of instructing the terminal 110 to change the connection cell, the base station 120 transmits the random access response 1000 including the MAC random access response 1100 with the R-bit 1101="1" to the terminal 110. In this case, the base station 120 may store a preferable cell ID list into a remaining field of the MAC random access response 1100. In the example depicted in FIG. 11, first to fifth 9-bit preferable cell IDs are stored into the MAC random access response 1100 as the preferable cell list.

In a case where the R-bit 1101 of the MAC random access response 1100 included in the random access response 1000 received from the base station 120 is "0", the terminal 110 continues the random access procedure and transmits the message 3 to the base station 120. In a case where the R-bit 1101 of the MAC random access response 1100 included in the random access response 1000 received from the base station 120 is "1", the terminal 110 changes the connected cell and starts the random access procedure over. In particular, the terminal 110 transmits the message 1 to a changed cell.

In this manner, the base station 120 can store a connect cell modify instruction into the reserved bit (R-bit 1101) in the MAC random access response 1100 (payload) of the random access response 1000. As a result, the connect cell modify instruction can be transmitted to the terminal 110 without adding a new control signal and control signal region.

In the case of storing a connect cell modify instruction into the R-bit 1101 in the MAC random access response 1100, the base station 120 stores a preferable cell ID into a region, different from the R-bit 1101, in the MAC random access response 1100. As a result, the preferable cell ID can be transmitted to the terminal 110 without adding a new control signal and control signal region.

Figure 12:
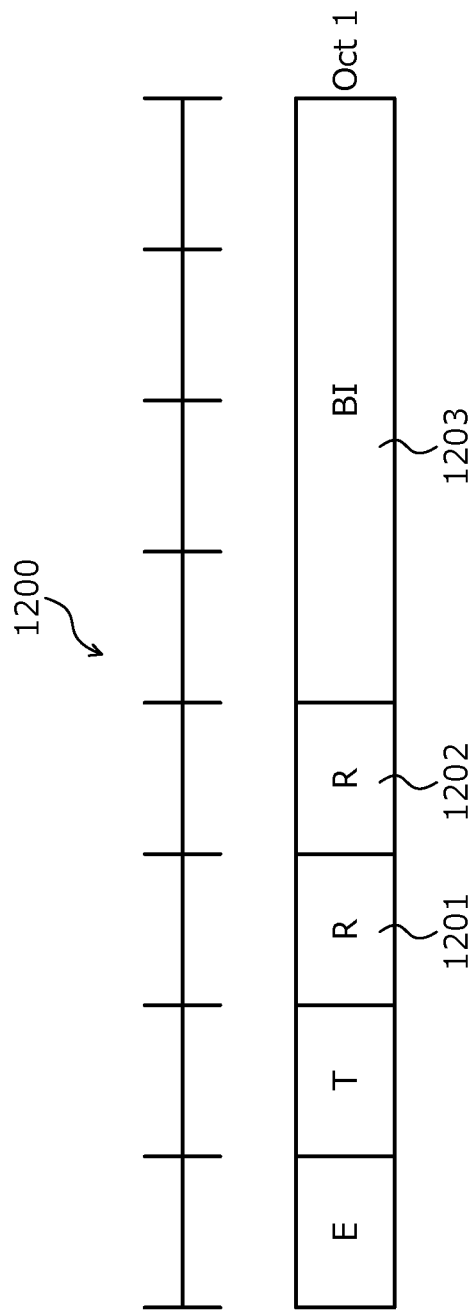
FIG. 12 is a diagram depicting a storage example 2 of storage of a connect cell modify instruction into a random access response in the first embodiment.

FIG. 12 is a diagram depicting a storage example 2 of storage of a connect cell modify instruction into a random access response in the first embodiment. A MAC subheader 1200 depicted in FIG. 12 is an E/T/R/R/BI MAC subheader (backoff indicator subheader) included in the MAC header 1010 of the random access response 1000 depicted in FIG. 10.

An E field of the E/T/R/R/BI MAC subheader is an extension field. The E field being "1" indicates that an E/T/RAPID field follows, whereas the E field being "0" indicates that the MAC RAR or the padding follows. A T field of the E/T/R/R/BI MAC subheader is a type field. The T field being "0" indicates that BI is included in the subheader, whereas the T field being "1" indicates that the RAPID is included in the subheader.

The base station 120 may store a connect cell modify instruction into a random access response, using R-bits 1201 and 1202 (2 bits) of the MAC subheader 1200, for example. In a case of not instructing the terminal 110 to change the connected cell, the base station 120 transmits the random access response 1000 including the MAC subheader 1200 with the R-bits 1201, 1202="00". In this case, the MAC subheader 1200 indicates a normal backoff indicator.

In a case of instructing the terminal 110 to change the connected cell, the base station 120 transmits the random access response 1000 including the MAC subheader 1200 with the R-bits 1201, 1202="11". In this case, the base station 120 may specify a probability of selecting another cell by a 4-bit backoff indicator (BI) field 1203 of the MAC subheader 1200. For example, the base station 120 specifies a probability of 16 levels (e.g., 1/16 to 16/16) by 4 bits of the BI field 1203.

The terminal 110 performs a lottery based on the probability specified by the BI field 1203 and in a case of being selected, changes the connected cell and retransmits a random access preamble. In a case of not being selected, the terminal 110 retransmits the random access preamble without changing the connected cell.

The base station 120 may indicate part (e.g., lower 4 bits) of a preferable cell ID by the BI field 1203. In this case, by determining IDs of preferable cells so that the preferable cell IDs do not overlap with each other using cell planning, for example, a preferable cell can be identified uniquely in spite of being indicated by a part of the preferable cell ID.

Under the current specifications, only one backoff indicator subheader can be included in a medium access control (MAC) protocol data unit (PDU) of the random access response. On the contrary, by using the extension field, for example, n (n is a plural number) backoff indicator subheaders may be included in the MAC PDU of the random access response, where, n is equal to the number of random access preamble identifiers (RAPIDs).

In this manner, the base station 120 can store a connect cell modify instruction into the 2-bit R-bits 1201 and 1202 in the E/T/R/R/BI MAC subheader of the MAC PDU of the random access response 1000. This enables the connect cell modify instruction to be transmitted to the terminal 110 without adding a new control signal and control signal region.

In the case of storing a connect cell modify instruction into the R-bits 1201 and 1202, the base station 120 stores information indicating a probability of changing the connected cell into the backoff indicator (BI) field 1203 of the E/T/R/R/BI MAC subheader. The BI field 1203 is information indicating the overload status of a cell. In this case, the terminal 110 changes the connected cell based on information indicating the probability and retransmits a random access preamble to a changed connected cell. As a result, the load balancing between cells can be performed without the base station 120 determining whether to cause the terminal 110 to change the connected cell.

In the case of storing a connect cell modify instruction into the R-bits 1201 and 1202, the base station 120 may store part of the preferable cell ID into the BI field 1203 of the E/T/R/R/BI MAC subheader. In this case, the terminal 110 identifies a preferable cell based on part of the preferable cell ID and transmits a random access preamble to the identified preferable cell. As a result, the connect cell modify instruction can be transmitted to the terminal 110 without adding a new control signal and control signal region.

Figure 13:
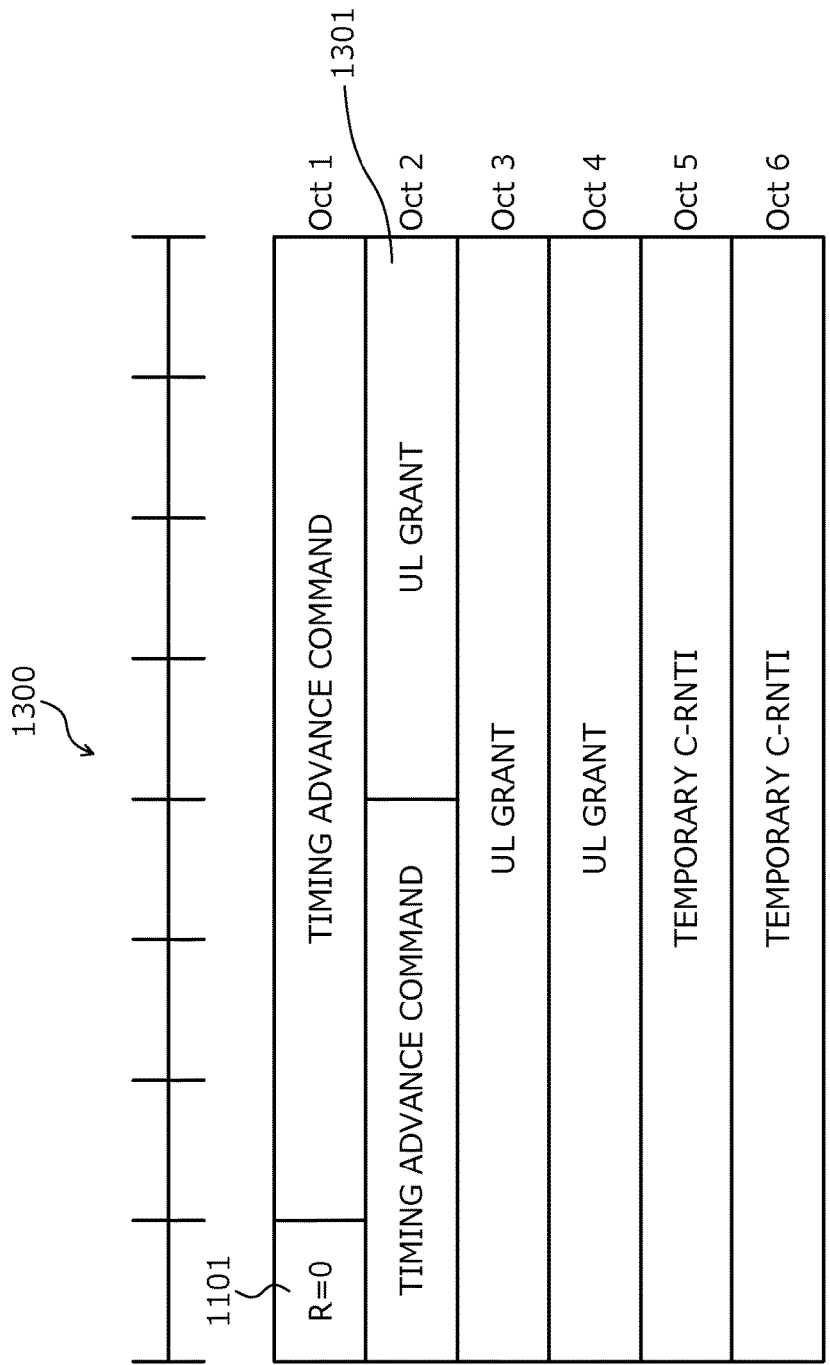
FIGS. 13 and 14 are diagrams depicting a storage example 3 of storage of a connect cell modify instruction into a random access response in the first embodiment.
Figure 14:
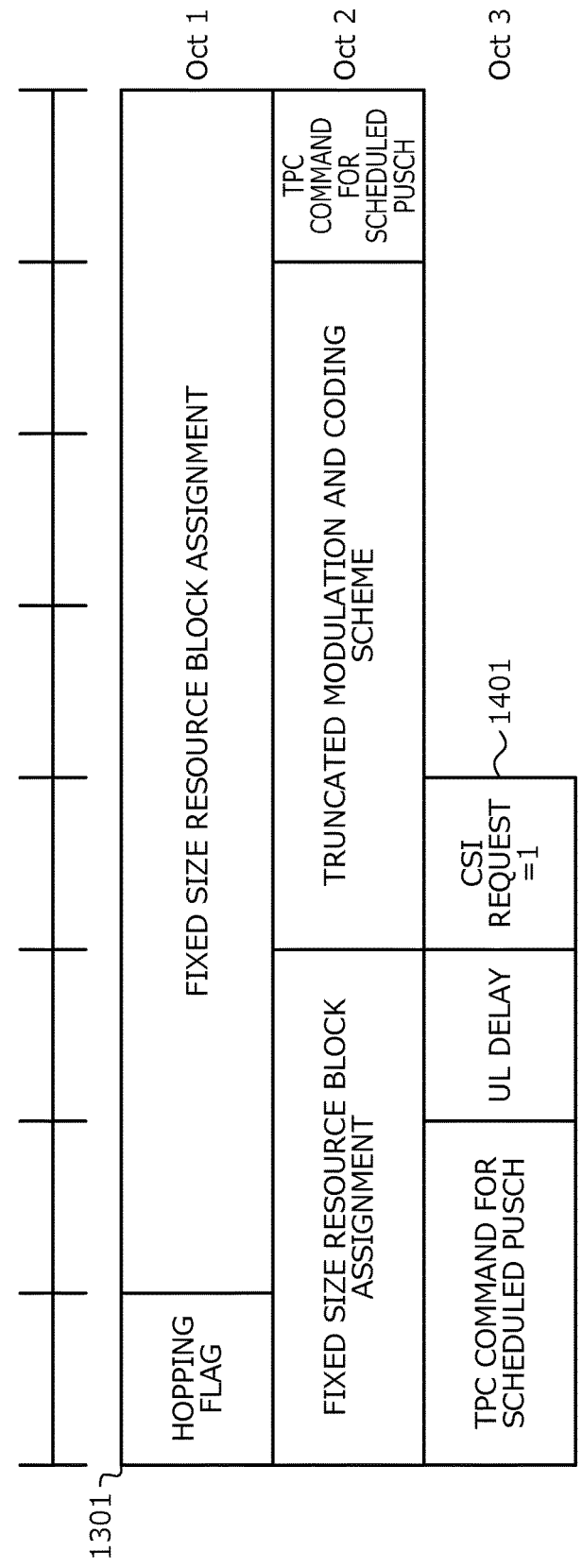

FIGS. 13 and 14 are diagrams depicting a storage example 3 of storage of a connect cell modify instruction into a random access response in the first embodiment. A MAC random access response 1300 depicted in FIG. 13 is a MAC random access response included in the MAC RAR1 to MAC RARn included in the MAC payload 1020 of the random access response 1000 depicted in FIG. 10.

Unlike the MAC random access response 1100 depicted in FIG. 11, the MAC random access response 1300 depicted in FIG. 13 has the R-bit 1101 set to "0" as in the normal random access response. An uplink (UL) grant 1301 depicted in FIG. 14 is the UL grant 1301 of the MAC random access response 1300.

A channel state information (CSI) request field 1401 of the UL grant 1301 is reserved in contention-based random access. The base station 120 may store a connect cell modify instruction into a random access response, using the CSI request field 1401 of the UL grant 1301, for example.

In a case of not instructing the terminal 110 to change the connected cell, the base station 120 transmits to the terminal 110, the random access response 1000 including the UL grant 1301 with the CSI request 1401="0".

In a case of instructing the terminal 110 to change the connected cell, the base station 120 transmits to the terminal 110, the random access response 1000 including the UL grant 1301 with the CSI request 1401="1". In this case, the terminal 110 ignores a field different from the CSI request 1401, of the MAC random access response 1300, for example.

In a case of instructing the terminal 110 to change the connected cell, the base station 120 may store a preferable cell ID (9 bits×2+padding) into a field (19 bits) different from the CSI request 1401, of the UL grant 1301.

In a case of instructing the terminal 110 to change the connected cell, the base station 120 may set all bits of the UL grant 1301 to "1" and thereby, store a connect cell modify instruction into the random access response 1000. In particular, in a case of not instructing the terminal 110 to change the connected cell, the base station 120 transmits to the terminal 110, the random access response 1000 including the UL grant 1301 storing information of fields depicted in FIG. 14, for example. In a case of instructing the terminal 110 to change the connected cell, the base station 120 transmits to the terminal 110, the random access response 1000 including the UL grant 1301 with all bits being set to "1".

In this manner, the base station 120 can store a connect cell modify instruction into the CSI request field 1401 of the UL grant 1301 in the MAC random access response 1300 (payload) of the random access response. As a result, the connect cell modify instruction can be transmitted to the terminal 110 without adding a new control signal and control signal region.

The base station 120 may set a new field to an existing MAC random access response and store a connect cell modify instruction or preferable cell IDs into the field.

In this case, even when the base station 120 stores a connect cell modify instruction into the random access response, information of existing random access responses can be maintained. Therefore, when receiving a random access response including a connect cell modify instruction, the terminal 110 may transmit the message 3 to a changed connected cell, using information included in the random access response, such as a timing advance (TA) command, the UL grant, and a temporary-cell radio network temporary identifier (T-CRNTI).

In a case where the reception timing from the cell #1 is concurrent with the reception timing from the cell #2, the terminal 110 transmits the message 3 to the cell #2, using a TA command included in the random access response received from the cell #1. In a case where the reception timing from the cell #1 differs from the reception timing from the cell #2, the terminal 110 retransmits a random access preamble to the cell #2.

In this manner, the base station 120 sets a new field in the random access response to store therein a connect cell modify instruction. As a result, the random access response that includes the connect cell modify instruction and information for the terminal 110 receiving the random access response to transmit a scheduled transmission to the base station 120, can be transmitted to the terminal 110. Examples of the information to transmit a scheduled transmission include the TA command, the UL grant, and the T-CRNTI.

In this case, the terminal 110 transmits the scheduled transmission (message 3) to a changed connected cell, based on the information to transmit a scheduled transmission. As a result, the terminal 110 needs not transmit a random access preamble to the changed connected cell, while the changed connected cell also needs not transmit a random access response to the terminal 110. As a result, transmission and reception of a control signal when changing a connected cell of the terminal 110 can be reduced.

Figure 15:
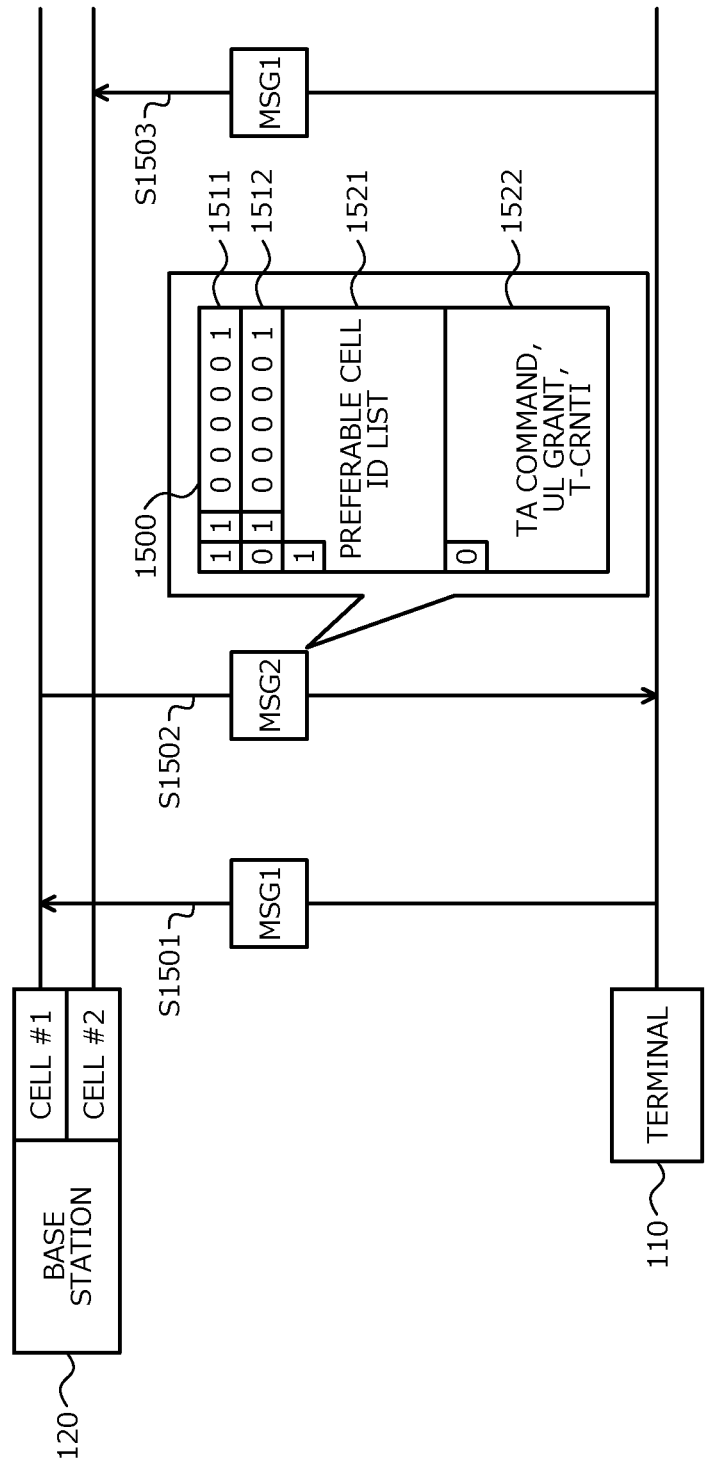
FIGS. 15 and 16 are diagrams depicting an example of backward compatibility in the first embodiment.
Figure 16:
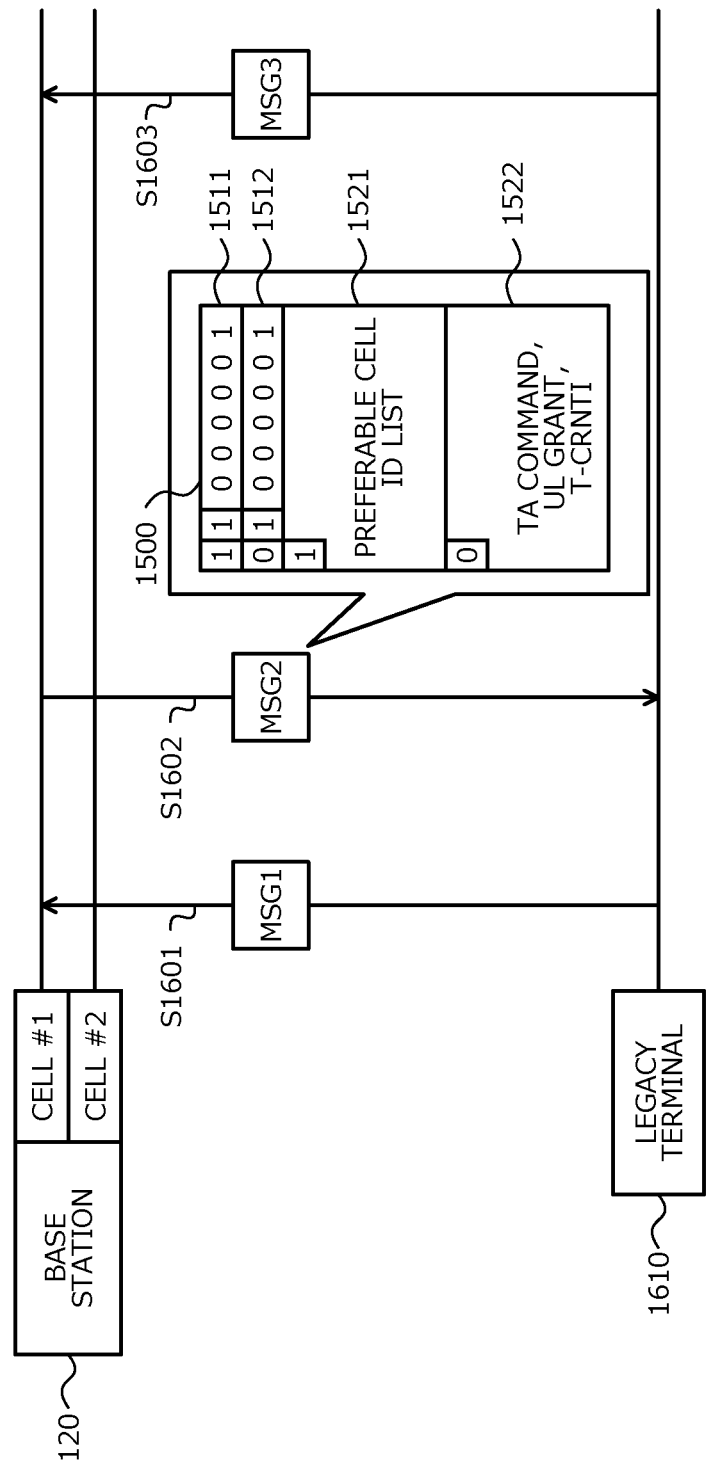

FIGS. 15 and 16 are diagrams depicting an example of the backward compatibility in the first embodiment. In the example depicted in FIGS. 15 and 16, the case will be described where a connect cell modify instruction is stored into a random access response by setting the R-bit 1101="1" as in the example depicted in FIGS. 10 and 11, for example.

Random access between the terminal 110 and the base station 120 will be described with reference to FIG. 15. First, the terminal 110 transmits the message 1 (MSG1) to the cell #1 of the base station 120 (step S1501). Next, the cell #1 of the base station 120 transmits the message 2 (MSG2) to the terminal 110 (step S1502).

The cell #1 of the base station 120 transmits a random access response 1500 as the message 2 at step S1502. The random access response 1500 includes headers 1511 and 1512 and messages 1521 and 1522 each corresponding to the message 2.

The header 1511 is a header corresponding to the message 1521. A first bit (extension) of the header 1511 is "1" indicating that the header 1511 is followed by a header (header 1512). A second bit (type field) of the header 1511 is "1" indicative of being a MAC random access response. Third to eighth bits of the header 1511 constitute an ID (RAPID) of the random access preamble received by the base station 120.

The header 1512 is a header that corresponds to the message 1522. A first bit (extension) of the header 1512 is "0" indicating that the header 1512 is not followed by a header. A second bit (type field) of the header 1512 is "1" indicative of being a MAC random access response. Third to eighth bits of the header 1512 constitute an ID (RAPID) of the random access preamble received by the base station 120. The third to eighth bits of the header 1512 represent the same ID as that represented by the third to eighth bits of the header 1511.

As depicted in FIG. 11, for example, the message 1521 is the message 2 with the initial R-bit set to "1" indicating a connect cell modify instruction and with the remaining field storing a preferable cell ID list. The message 1522 is the normal message 2 not including the connect cell modify instruction or the preferable cell ID and includes the TA command, the UL grant, the T-CRNTI, etc.

On the contrary, when receiving the random access response 1500 including the messages 1521 and 1522 as depicted in FIG. 15, the terminal 110 according to the first embodiment reselects a connection cell based on the message 1521 and starts the random access procedure over. For example, the terminal 110 selects the cell #2 of the base station 120 as a new connection cell and transmits the message 1 (MSG1) to the cell #2 (step S1503).

Random access between a legacy terminal 1610 and the base station 120 will be described with reference to FIG. 16. The legacy terminal 1610 is a conventional terminal that does not recognize a connect cell modify instruction included in the random access response. In FIG. 16, parts similar to those depicted in FIG. 15 are given the same reference numerals used in FIG. 15 and explanations thereof will be omitted.

First, the legacy terminal 1610 transmits the message 1 (MSG1) to the cell #1 of the base station 120 (step S1601). Next, the cell #1 of the base station 120 transmits the message 2 (MSG2) to the legacy terminal 1610 (step S1602). The message 2 transmitted at step S1602 is the random access response 1500 similar to that of the example depicted in FIG. 15.

On the contrary, when receiving the random access response 1500 including the messages 1521 and 1522, the legacy terminal 1610 ignores the message 1521 because the R-bit of the message 1521 is "1" and invalid. The legacy terminal 1610 then continues the random access procedure in accordance with the message 1522 and transmits the message 3 (MSG3) to the cell #1 of the base station 120 (step S1603).

In this manner, the base station 120 transmits, for example, the message 2 according to the first embodiment and the normal message 2 at the same time whereby backward compatibility can be implemented.

Figure 17:
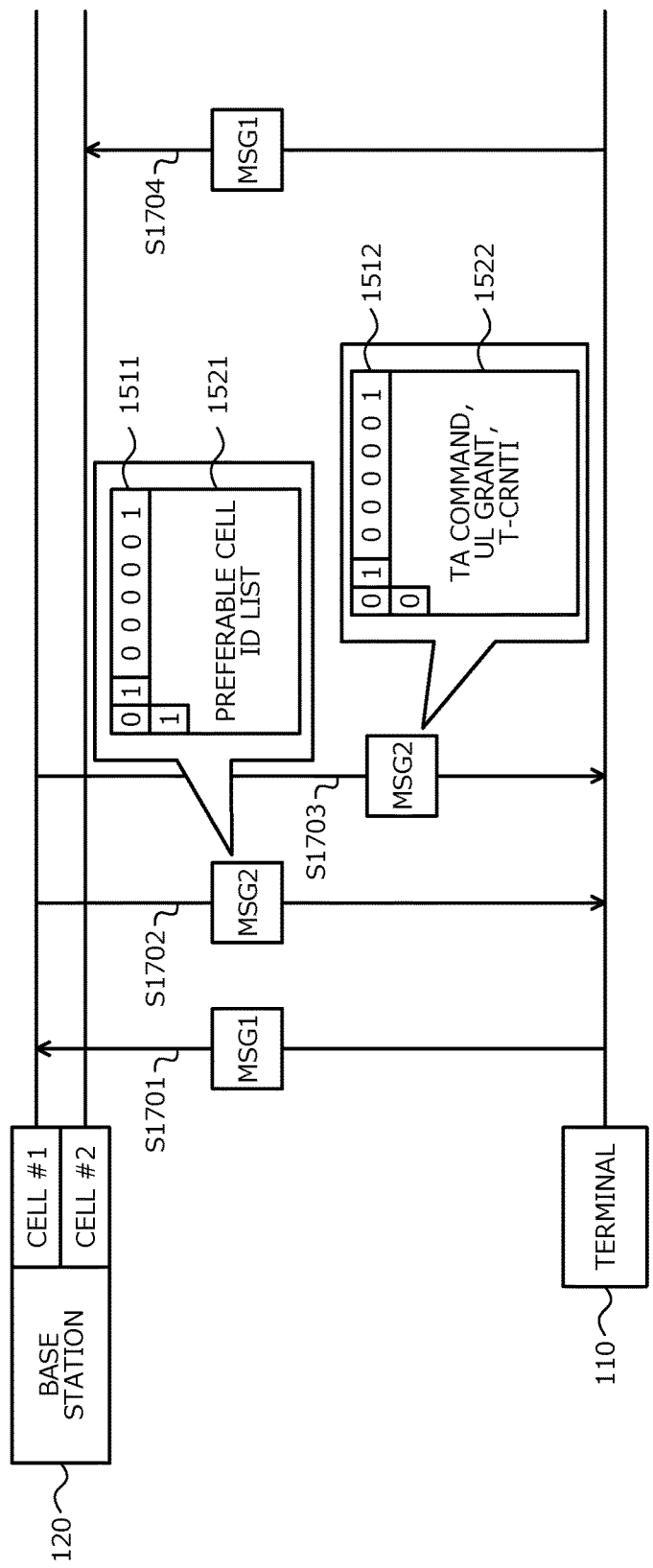
FIGS. 17 and 18 are diagrams depicting another example of backward compatibility in the first embodiment.
Figure 18:
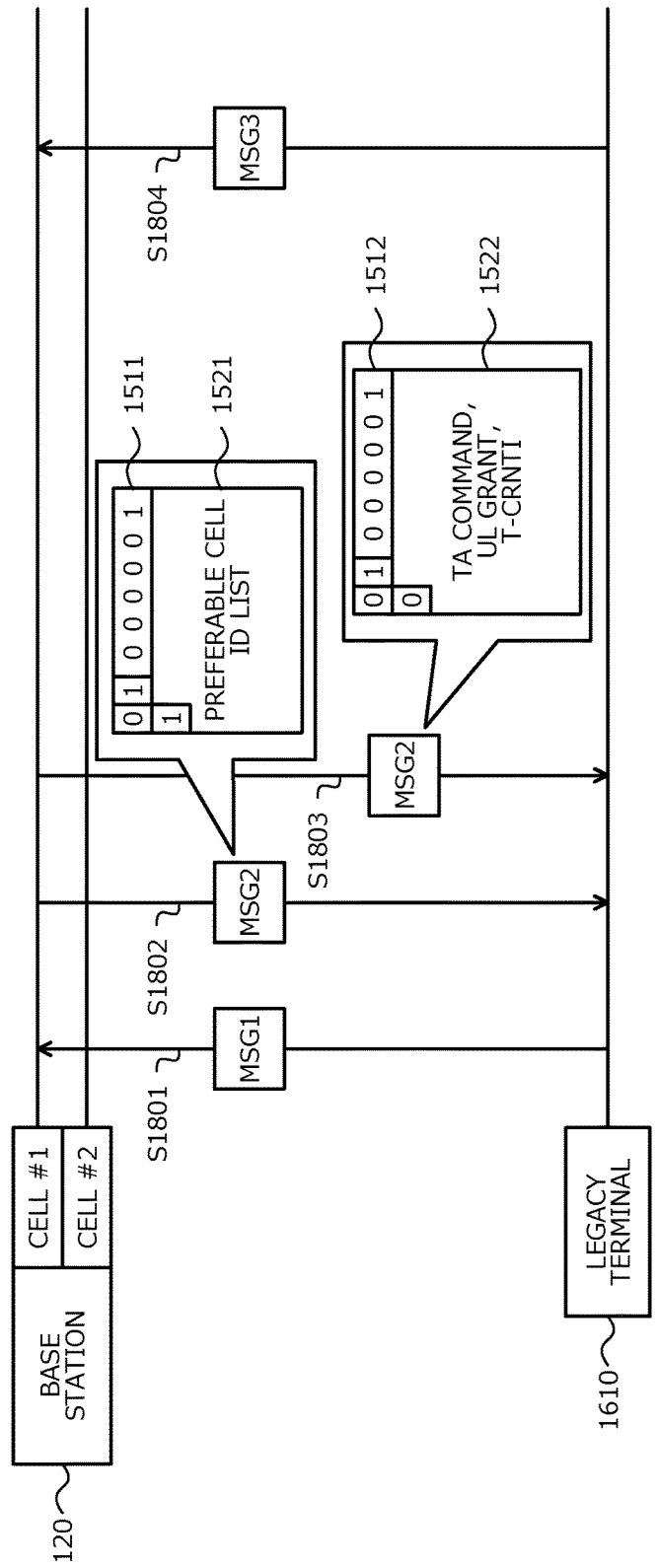

FIGS. 17 and 18 are diagrams depicting another example of backward compatibility in the first embodiment. In FIGS. 17 and 18, parts similar to those depicted in FIGS. 15 and 16 are given the same reference numeral used in FIGS. 15 and 16, and explanations thereof will be omitted. Random access between the terminal 110 and the base station 120 will be described with reference to FIG. 17. First, the terminal 110 transmits the message 1 (MSG1) to the cell #1 of the base station 120 (step S1701).

Next, the cell #1 of the base station 120 transmits a message including the header 1511 and the message 1521 as the message 2 (MSG2) (step S1702). In the example depicted in FIG. 17, a first bit (extension) of the header 1511 is "0" indicating that the header 1511 is not followed by a header. The cell #1 of the base station 120 transmits a message including the header 1512 and the message 1522 as the message 2 (MSG2) (step S1703).

On the contrary, as depicted in FIG. 17, the terminal 110 according to the first embodiment reselects a connected cell in accordance with the message 1521 received earlier and starts the random access procedure over. For example, the terminal 110 selects the cell #2 of the base station 120 as a new connection cell and transmits the message 1 (MSG1) to the cell #2 (step S1704).

Random access between the legacy terminal 1610 and the base station 120 will be described with reference to FIG. 18. First, the legacy terminal 1610 transmits the message 1 (MSG1) to the cell #1 of the base station 120 (step S1801).

Next, the cell #1 of the base station 120 transmits a message including the header 1511 and the message 1521 as the message 2 (MSG2) (step S1802). The cell #1 of the base station 120 then transmits a message including the header 1512 and the message 1522 as the message 2 (MSG2) (step S1803).

On the contrary, the legacy terminal 1610 ignores the message 1521 because the R-bit of the earlier received message 1521 is "1" and invalid. The legacy terminal 1610 then continues the random access procedure in accordance with the next received message 1522 and transmits the message 3 (MSG3) to the cell #1 of the base station 120 (step S1804).

In this manner, the base station 120 may separately transmit the message 2 according to the first embodiment and the conventional message 2. As a result, backward compatibility can be implemented.

Figure 19:
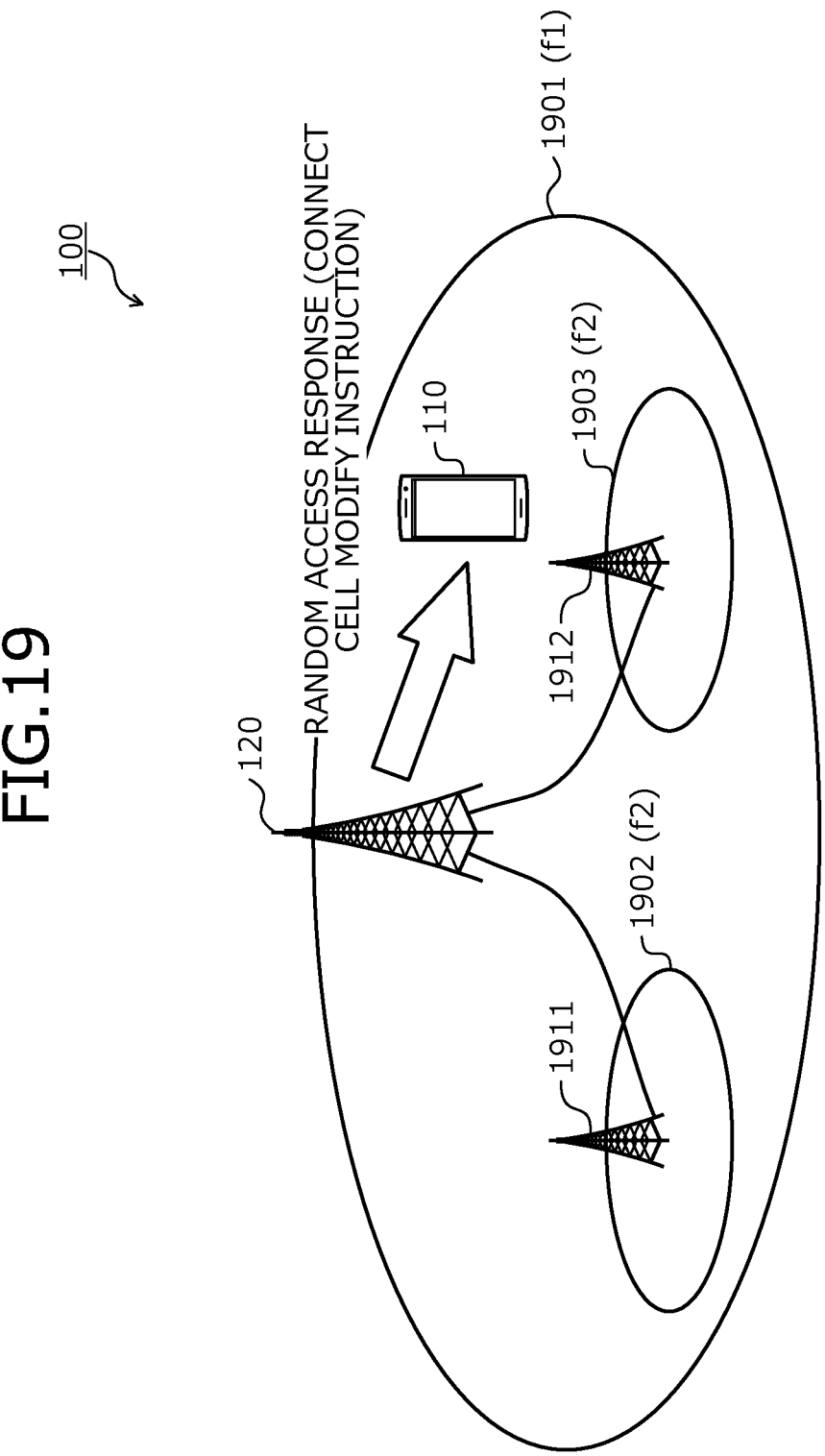
FIG. 19 is a diagram depicting another example of the wireless communications system according to the first embodiment.

FIG. 19 is a diagram depicting another example of the wireless communications system according to the first embodiment. In FIG. 19, parts similar to those depicted in FIG. 1 are given the same reference numerals used in FIG. 1 and explanations thereof will be omitted. As depicted in FIG. 19, the wireless communications system 100 may be configured to include small cells 1902 and 1903 within an area of a macrocell 1901. In the example depicted in FIG. 19, the base station 120 is a macro base station forming the macrocell 1901. The macrocell 1901 is a cell of a frequency f1.

Base stations 1911 and 1912 are, for example, small base stations forming small cells 1902 and 1903 within the area of the macrocell 1901. Each of the small cells 1902 and 1903 is a cell of, for example, a frequency f2 different from the frequency f1. The macrocell 1901 and the small cells 1902 and 1903 have different cell IDs.

In this case, the base station 120 acquires load information indicating the load statuses of the small cells 1902 and 1903 from the base stations 1911 and 1912, respectively, via the inter-base-station interface. The base station 120 then determines a preferable cell for the terminal 110 from among the macrocell 1901 and the small cells 1902 and 1903, based on the load information of the macrocell 1901 of the base station 120 and on the load information acquired from the base stations 1911 and 1912.

Although a case has been described where the base station 120 forms the macrocell 1901, the base station 120 may be configured to form plural cells. Similarly, each of the small cells 1902 and 1903 may be configured to form plural cells.

In the configuration depicted in FIG. 19, instead of the base stations 1911 and 1912, antennas or RRHs of the base station 120 may be disposed geographically apart from the base station 120 so that the antennas or the RRHs form the small cells 1902 and 1903.

In this case, the base station 120 acquires load information indicating the load statuses of the small cells 1902 and 1903 formed by the antennas or the RRHs of the base station 120 and determines a preferable cell of the terminal 110 based on the acquired load information.

Although a case is depicted in FIG. 19 where the terminal 110 performs the random access procedure between the terminal 110 and the base station 120, a random access response is transmitted from the base station 1911 to the terminal 110 when the terminal 110 performs the random access procedure between the terminal 110 and the base station 1911. In a similar manner, when the terminal 110 performs the random access procedure between the terminal 110 and the base station 1912, the random access response is transmitted from the base station 1912 to the terminal 110.

Figure 20:
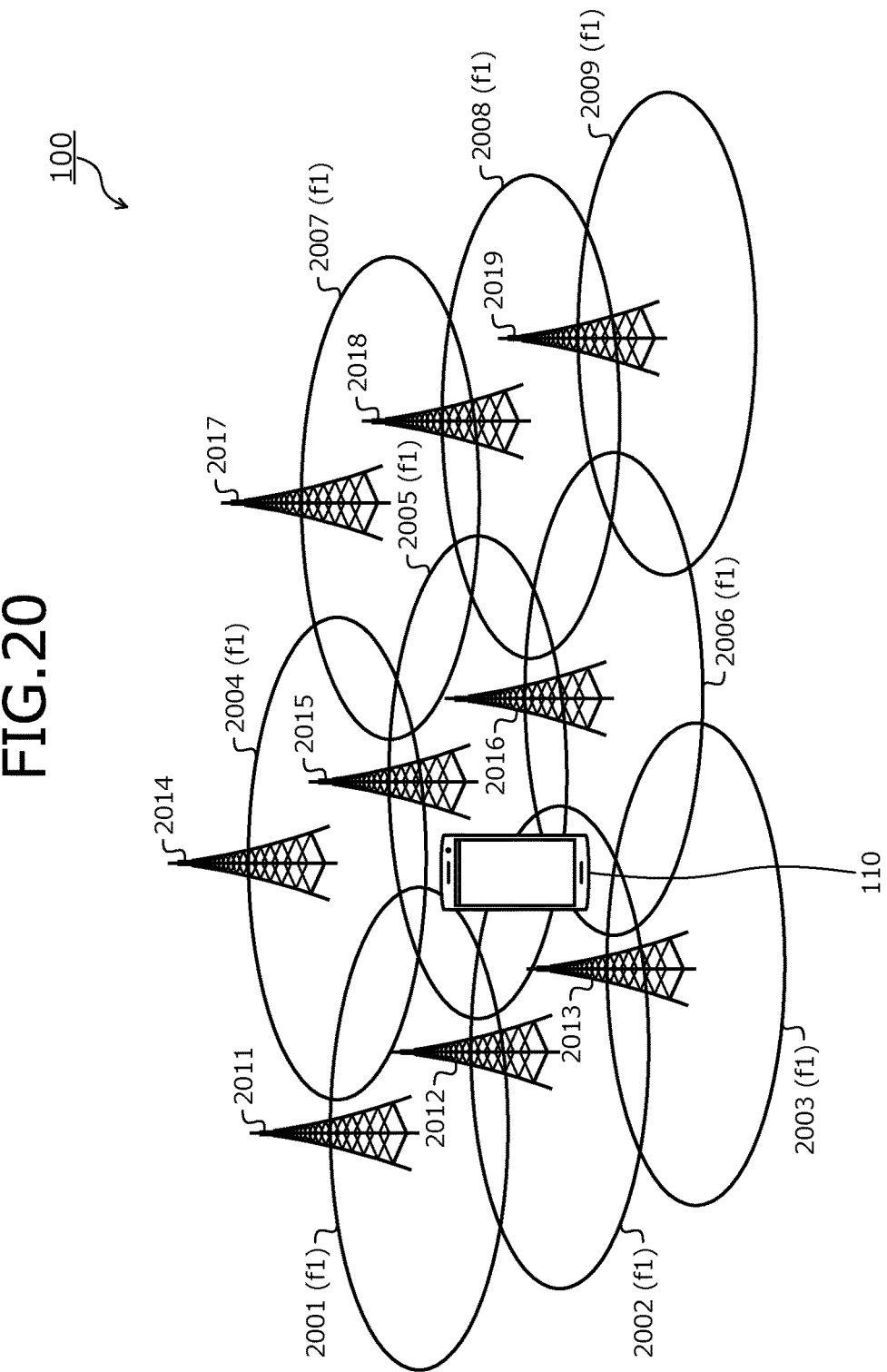
FIG. 20 is a diagram depicting another example of the wireless communications system according to the first embodiment.

FIG. 20 is a diagram depicting another example of the wireless communications system according to the first embodiment. In FIG. 20, parts similar to those depicted in FIG. 1 are given the same reference numerals used in FIG. 1 and explanations thereof will be omitted. As depicted in FIG. 20, the wireless communications system 100 may be configured such that small cells 2001 to 2009 are densely deployed (formed). In the example depicted in FIG. 20, the wireless communications system 100 includes base stations 2011 to 2019.

The base stations 2011 to 2019 are base stations each corresponding to the base station 120 described above and are small base stations forming the small cells 2001 to 2009, respectively. In the example depicted in FIG. 20, the small cells 2001 to 2009 are each a cell of the frequency f1. The small cells 2001 to 2009 may have frequencies different from each other. A macrocell, for example, may further overlap the small cells 2001 to 2009 depicted in FIG. 20.

For example, a case will be described where the base station 2015 receives a random access preamble from the terminal 110.

The base station 2015 acquires load information of the small cell 2005 of the base station 2015 and of cells (e.g., the small cells 2001, 2002, 2004, and 2006 to 2008) of base stations neighboring the base station 2015. The load information of cells of base stations neighboring the base station 2015 can be acquired, for example, via the inter-base-station interface from the base stations (e.g., the base stations 2011, 2012, 2014, and 2016 to 2018) neighboring the base station 2015.

Although a case has been described where the base stations 2011 to 2019 form the small cells 2001 to 2009, respectively, configuration may be such that the base stations 2011 to 2019 each form plural small cells.

In the configuration depicted in FIG. 20, instead of the base stations 2011 to 2019, antennas or RRHs of the base station 120 may be disposed geographically apart from the base station 120 so that the antennas or the RRHs form the small cells 2001 to 2009.

In this case, the base station 120 acquires load information indicating the load statuses of the small cells 2001 to 2009 formed by the antennas or the RRHs of the base station 120 and determines a preferable cell for the terminal 110 based on the acquired load information.

An instance of storing a preferable cell into a random access response is described above. On the contrary, the base station 120 may store an unfavorable cell ID list indicating unfavorable cells that are unfavorable as change destination cells. In this case, the terminal 110 measures signals of cells different from the cells indicated by the unfavorable cell IDs and selects, as a new connection cell, a cell whose measurement result satisfies a predetermined condition.

In this manner, according to the wireless communications system 100 of the first embodiment, the base station 120 stores a connect cell modify instruction into a random access response in the random access procedure for transmission whereby a connected cell of the terminal 110 can be controlled. As a result, load balancing between cells can be performed according to the load statuses of cells.

As compared to, for example, a case of storing a connect cell modify instruction into the contention resolution (message 4) in the random access procedure and transmitting the contention resolution (message 4), the terminal 110 can change a connected cell at an earlier stage in the initial access of the terminal 110. Consequently, transmission and reception of control signals in a congested cell can be suppressed. Therefore, load balancing between cells can be performed in a period immediately after the transmission of the random access response from the base station 120, for example.

Herein, a case has been described where the base station 120 stores a connect cell modify instruction and a preferable cell into a random access response. On the contrary, the base station 120 may transmit a random access response including IDs of cells to which connection is to be avoided preferably by the terminal 110 and a connect cell modify instruction. Hereinafter, a cell to which connection is to be preferably avoided by the terminal 110 is referred to as an unfavorable cell and an identifier of an unfavorable cell is referred to as an unfavorable cell ID.

Similar to the preferable cell, the unfavorable cell can be selected according to the load statuses of cells. For example, the preferable cell can be a less-loaded cell whereas the unfavorable cell can be a heavily-loaded cell.

In this case, if a predetermined condition is satisfied by a cell different from unfavorable cells indicated by the unfavorable cell IDs among connectable cells, the terminal 110 performs processing of connection to the different cell. If a different cell does not satisfy the predetermined condition, the terminal 110 performs processing of connection to at least one of the unfavorable cells. As a result, connection to an unfavorable cell indicated by the unfavorable cell IDs can be avoided preferably.

In this manner, the base station 120 stores unfavorable cell IDs selected according to the load statuses of cells into a random access response whereby the terminal 110 is connected to a less-loaded cell so that load balancing between cells can be performed. The base station 120 stores plural unfavorable cell IDs selected based on the load statues of the cells into a random access response and thereby increases the possibility of connection of the terminal 110 to a less-loaded cell whereby load balancing between cells can be performed.

Portions of a second embodiment different from the first embodiment will be described. Although in the first embodiment a case is described where a connect cell modify instruction is stored into the random access response (message 2), in the second embodiment a case will be described where the connect cell modify instruction is stored into the contention resolution (message 4).

Figure 21:
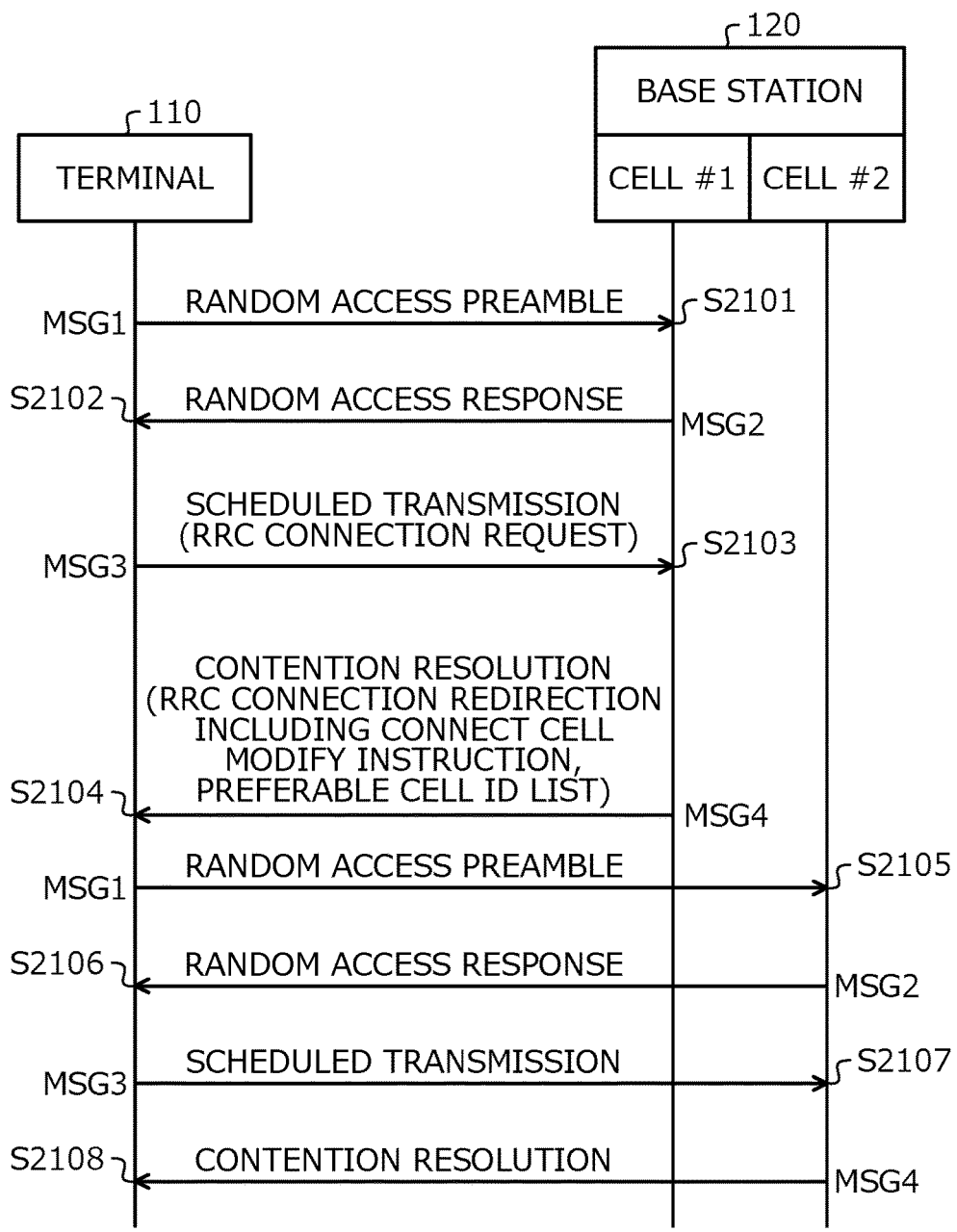
FIG. 21 is a sequence diagram depicting a processing example 1 of a wireless communications system according to a second embodiment.

FIG. 21 is a sequence diagram depicting a processing example 1 of a wireless communications system according to the second embodiment. In the wireless communications system 100 according to the second embodiment, steps depicted in FIG. 21, for example, are executed.

First, the terminal 110 selects the cell #1 of the base station 120 as a connection destination and transmits to the cell #1 of the base station 120, a random access preamble as the message 1 (MSG1) in the random access procedure (step S2101). Next, the cell #1 of the base station 120 transmits to the terminal 110, a random access response as the message 2 (MSG2) in the random access procedure (step S2102).

Next, the terminal 110 transmits to the cell #1 of the base station 120, a scheduled transmission as the message 3 (MSG3) in the random access procedure (step S2103). The scheduled transmission includes an RRC connection request requesting establishment of an RRC connection.

Next, the cell #1 of the base station 120 transmits to the terminal 110, a contention resolution as the message 4 (MSG4) in the random access procedure (step S2104). The contention resolution includes, for example, a newly defined RRC connection redirection.

In the example depicted in FIG. 21, the cell #1 of the base station 120 is assumed to store the connect cell modify instruction and the preferable cell ID list into the RRC connection redirection included in the contention resolution transmitted at step S2104. Further, the terminal 110 is assumed to change the connected cell from the cell #1 to the cell #2, based on the connect cell modify instruction included in the RRC connection redirection of the contention resolution received at step S2104.

Next, the terminal 110 transmits to the cell #2 of the base station 120, a random access preamble as the message 1 (MSG1) in the random access procedure (step S2105). Next, the cell #2 of the base station 120 transmits to the terminal 110, a random access response as the message 2 (MSG2) in the random access procedure (step S2106). Next, the terminal 110 transmits to the cell #2 of the base station 120, a scheduled transmission as the message 3 (MSG3) in the random access procedure (step S2107).

Next, the cell #2 of the base station 120 transmits to the terminal 110, a contention resolution as the message 4 (MSG4) in the random access procedure (step S2108). In the example depicted in FIG. 21, the cell #2 of the base station 120 is assumed to transmit an RRC connection setup by the contention resolution transmitted at step S2108. In this case, connection of the terminal 110 to the cell #2 of the base station 120 is completed.

In this manner, the base station 120 stores a connect cell modify instruction and a preferable cell ID list into a contention resolution in the random access procedure. As a result, the possibility that the radio quality in the changed connected cell may satisfy connection requirements can be increased. The probability of an occurrence of a case in which a random access preamble transmitted from the terminal 110 to a changed connected cell does not arrive at the changed connected cell can also be reduced.

Figure 22:
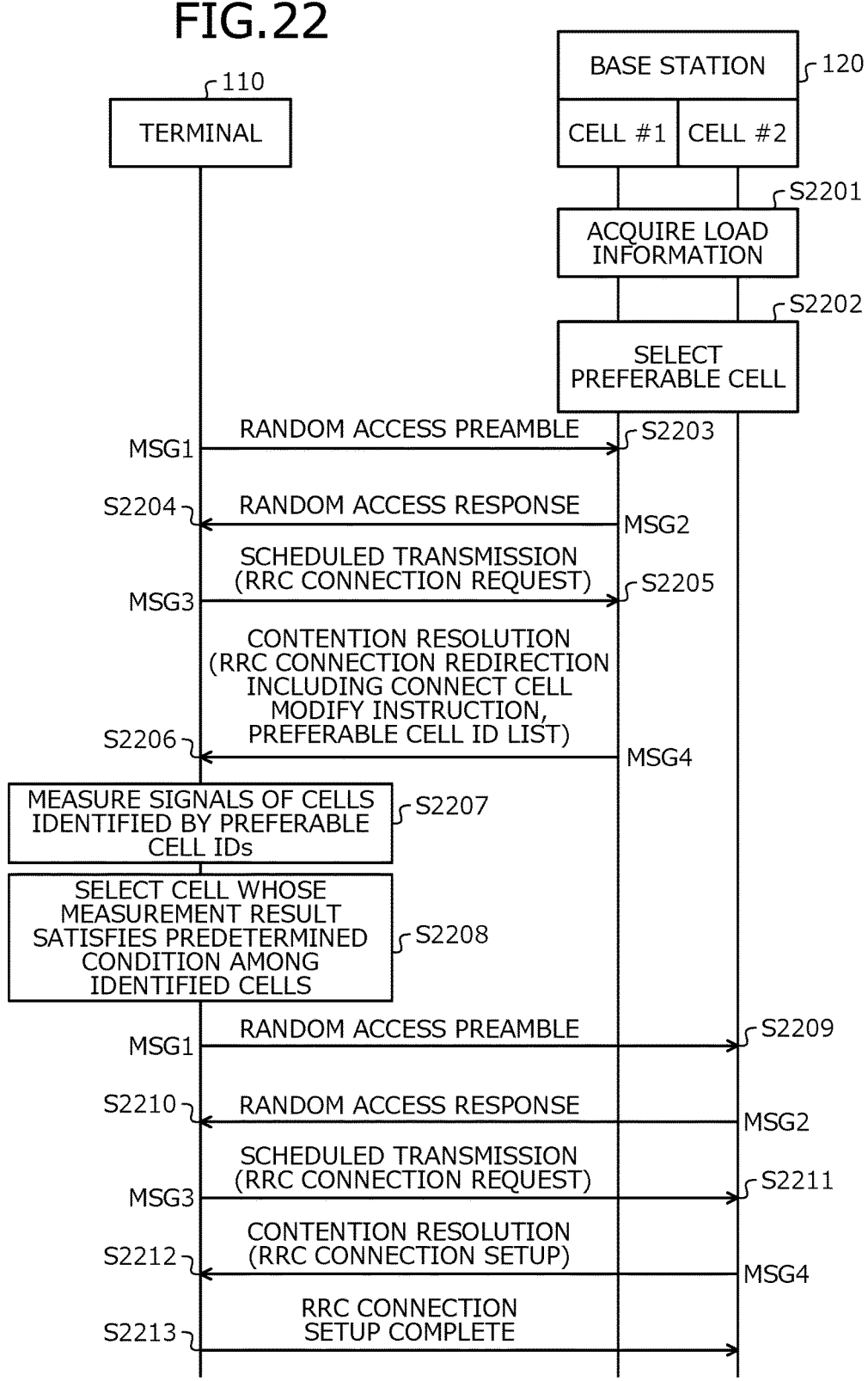
FIG. 22 is a sequence diagram depicting details of the processing example 1 of the wireless communications system according to the second embodiment.

FIG. 22 is a sequence diagram depicting details of the processing example 1 of the wireless communications system according to the second embodiment. Steps S2201 and S2202 depicted in FIG. 22 are similar to steps S301 and S302 depicted in FIG. 3. Steps S2203 to S2206 depicted in FIG. 22 are similar to steps S2101 to S2104 depicted in FIG. 21.

Steps S2207 to S2212 are similar to steps S205 to S310 depicted in FIG. 3. Note that at step S2207, the terminal 110 performs measurement based on the connect cell modify instruction and the preferable cell ID list included in the RRC connection redirection of the contention resolution received at step S2206. The scheduled transmission transmitted at step S2211 includes an RRC connection request, while the contention resolution transmitted at step S2212 includes an RRC connection setup.

Subsequent to step S2212, the terminal 110 performs setting of an RRC connection based on the RRC connection setup of the contention resolution received at step S2212. The terminal 110 then transmits an RRC connection setup complete to the cell #2 of the base station 120 (step S2213).

As depicted in FIGS. 21 and 22, the base station 120 can store a connect cell modify instruction into, for example, a dedicated RRC connection redirection for storing the connect cell modify instruction in the contention resolution.

Figure 23:
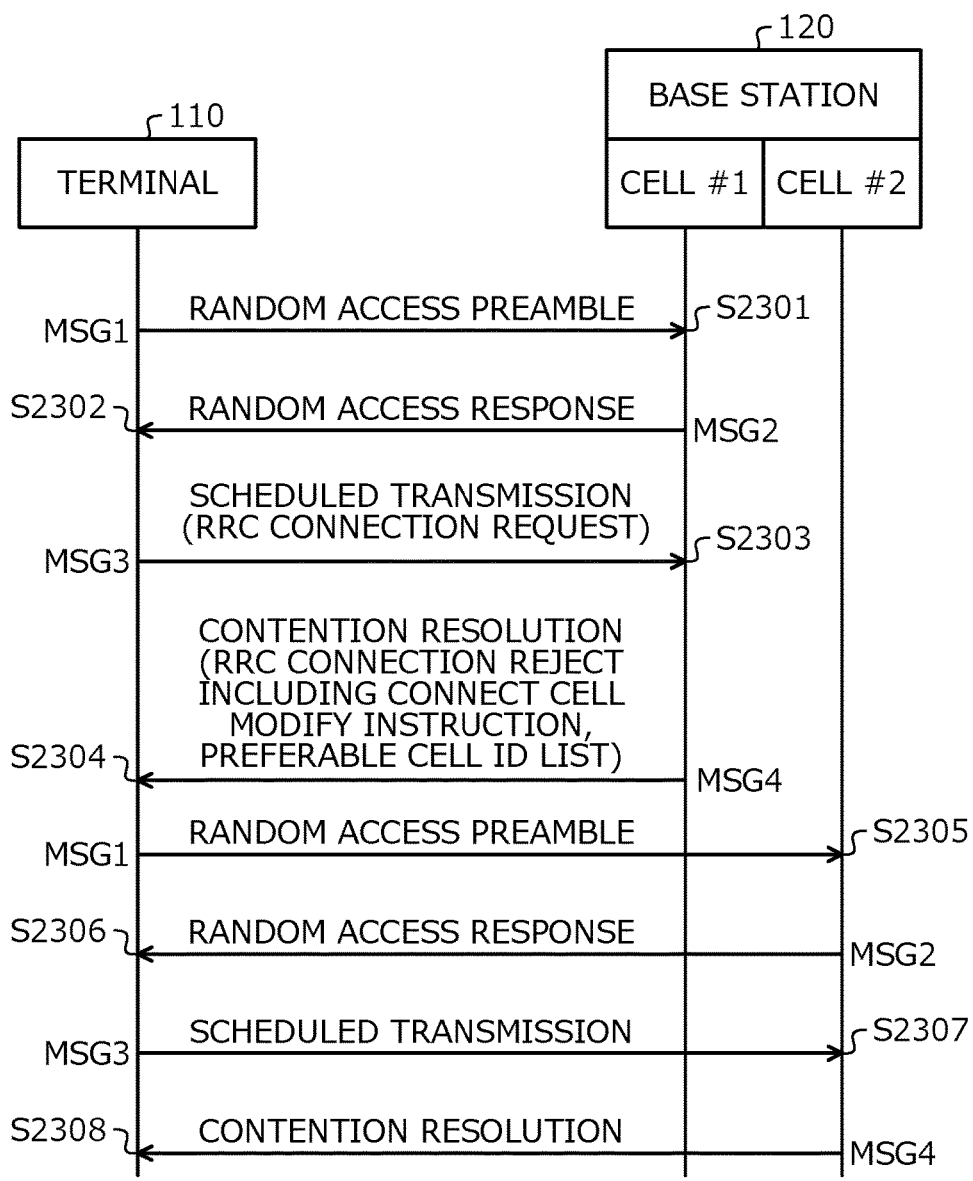
FIG. 23 is a sequence diagram depicting a processing example 2 of the wireless communications system according to the second embodiment.

FIG. 23 is a sequence diagram depicting a processing example 2 of the wireless communications system according to the second embodiment. In the wireless communications system 100 according to the second embodiment, steps depicted in FIG. 23, for example, may be executed. Steps S2301 to S2308 depicted in FIG. 23 are similar to steps S2101 to S2108 depicted in FIG. 21.

Note that at step S2304, the cell #1 of the base station 120 stores an RRC connection reject including a connect cell modify instruction and a preferable cell ID list into a contention resolution to be transmitted. In this manner, in a case where the base station 120 causes the terminal 110 to change the connected cell, the base station 120 may store the connect cell modify instruction and the preferable cell ID list into the RRC connection reject included in the contention resolution.

FIG. 24 is a sequence diagram depicting details of the processing example 2 of the wireless communications system according to the second embodiment. Steps S2401 to S2413 depicted in FIG. 24 are similar to steps S2201 to S2213 depicted in FIG. 22. Note that at step S2406, the cell #1 of the base station 120 stores a connect cell modify instruction and a preferable cell ID list into an RRC connection reject of a contention resolution to be transmitted.

FIG. 25 is a diagram depicting an example of the RRC connection reject in the processing example 2 of the wireless communications system according to the second embodiment. The base station 120 transmits an RRC connection reject 2500 depicted in FIG. 25, for example, as the RRC connection reject described above. The RRC connection reject 2500 has a data structure of the RRC connection reject transmitted from the base station 120, described by abstract syntax notation one (ASN.1).

The RRC connection reject 2500 is a message with "ConnectCellModify" and "preferableCellIdList" designated by reference numerals 2501 and 2502 (underlined portions) added to an RRC connection reject defined in TS36.331 of 3GPP.

The base station 120 stores a connect cell modify instruction into "ConnectCellModify" of the RRC connection reject 2500. The base station 120 stores a preferable cell ID list into "preferableCellIdList" of the RRC connection reject 2500.

FIG. 26 is a diagram depicting another example of the RRC connection reject in the processing example 2 of the wireless communications system according to the second embodiment. The base station 120 may transmit an RRC connection reject 2600 depicted in FIG. 26, for example. The RRC connection reject 2600 has a data structure of the RRC connection reject transmitted from the base station 120, described by ASN.1.

The RRC connection reject 2600 is a message with "RRCConnectionReject-v13xy-IEs" designated by reference numeral 2603 (underlined portion) added to "nonCriticalExtension" of the RRC connection reject defined in TS36.331 of 3GPP, the message having the contents of "ConnectCellModify" and "preferableCellIdList" as designated by reference numerals 2601 and 2602 (underlined portions).

The base station 120 stores a connect cell modify instruction into "ConnectCellModify" of the RRC connection reject 2600. The base station 120 stores a preferable cell ID list into "preferableCellIdList" of the RRC connection reject 2600.

Figure 27:
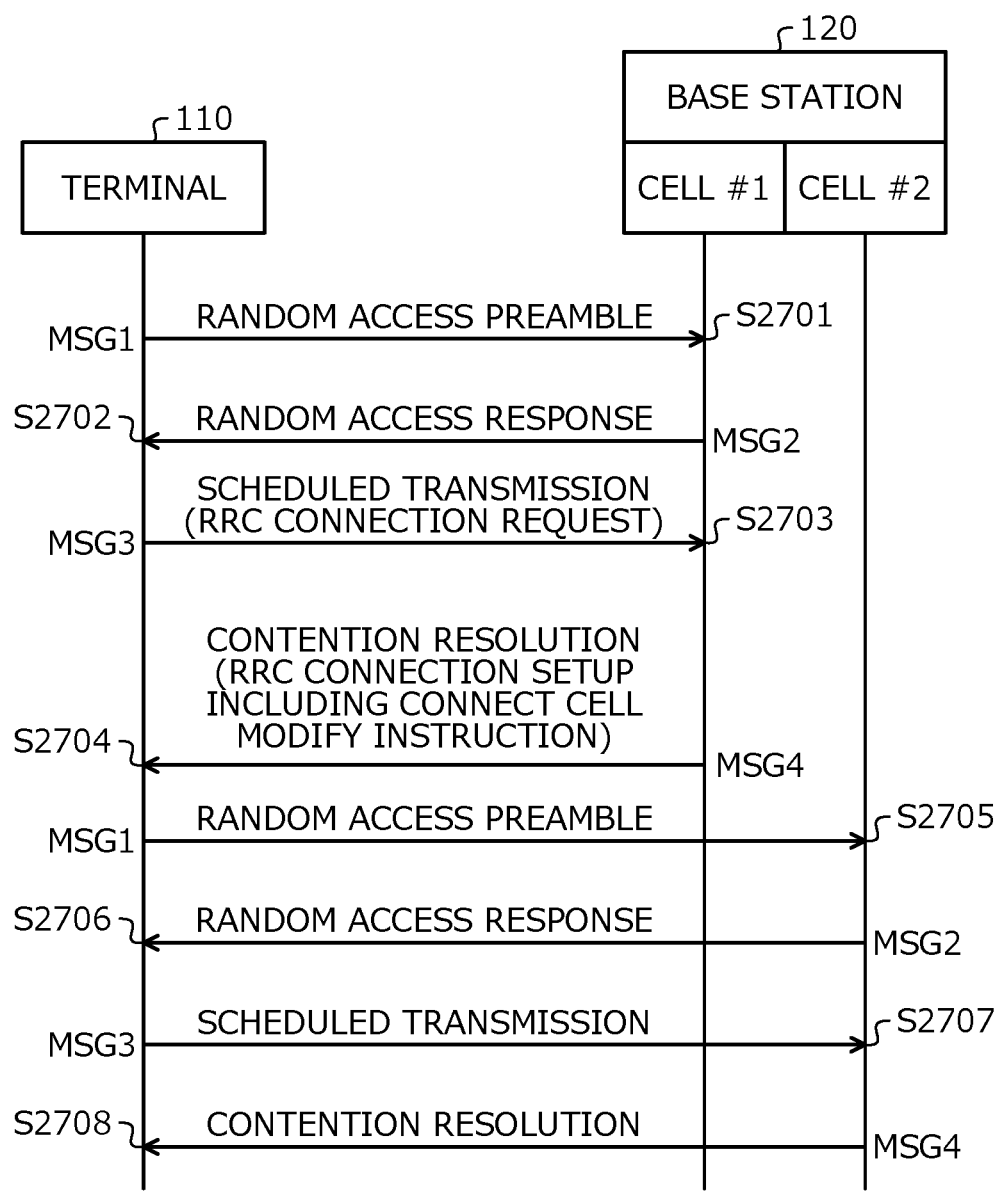
FIG. 27 is a sequence diagram depicting a processing example 3 of the wireless communications system according to the second embodiment.

FIG. 27 is a sequence diagram depicting a processing example 3 of the wireless communications system according to the second embodiment. In the wireless communications system 100 according to the second embodiment, steps depicted in FIG. 27, for example, may be executed. Steps S2701 to S2708 depicted in FIG. 27 are similar to steps S2301 to S2308 depicted in FIG. 23.

Note that at step S2704, the cell #1 of the base station 120 stores a connect cell modify instruction into an RRC connection setup of a contention resolution to be transmitted. The cell #1 of the base station 120 may further store a preferable cell ID list into the RRC connection setup.

The terminal 110 changes the connected cell from the cell #1 to the cell #2, for example, based on the connect cell modify instruction included in the RRC connection setup of the contention resolution received at step S2704.

FIG. 28 is a diagram depicting an example of the RRC connection setup in the processing example 3 of the wireless communications system according to the second embodiment. The base station 120 transmits an RRC connection setup 2800 depicted in FIG. 28 for example as the RRC connection setup described above. The RRC connection setup 2800 has a data structure, represented by ASN.1, of the RRC connection setup transmitted from the base station 120.

The RRC connection setup 2800 is a message with "ConnectCellModify" and "preferableCellIdList" designated by reference numerals 2801 and 2802 (underlined portions) added to an RRC connection setup defined in TS36.331 of 3GPP.

The base station 120 stores a connect cell modify instruction into "ConnectCellModify" of the RRC connection setup 2800. The base station 120 stores a preferable cell ID list into "preferableCellIdList" of the RRC connection setup 2800.

Figure 30:
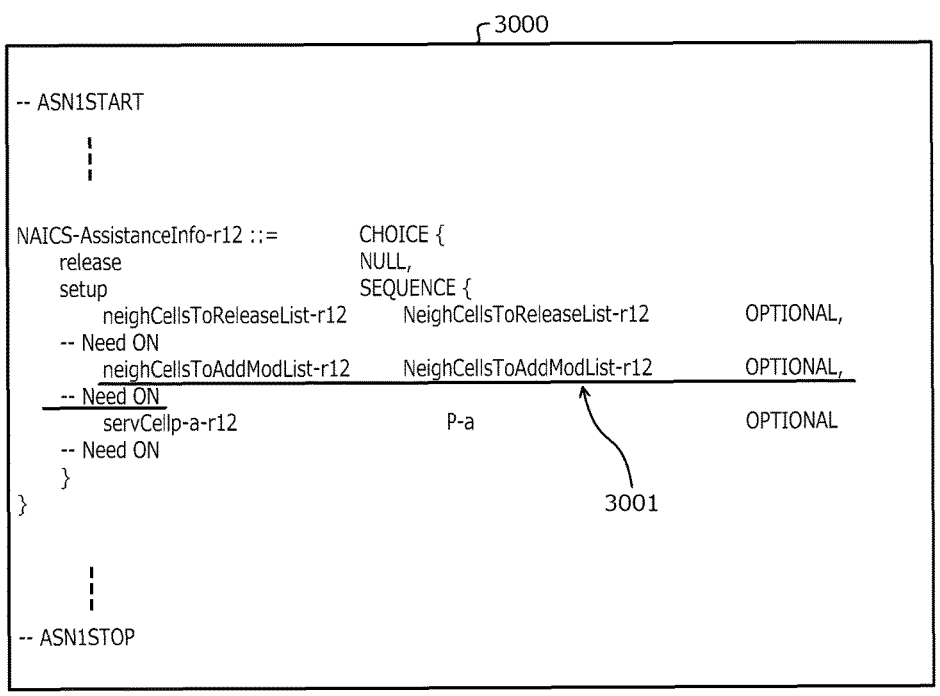

FIGS. 29 and 30 are diagrams depicting another example of the RRC connection setup in the processing example 3 of the wireless communications system according to the second embodiment. The base station 120 may transmit an RRC connection setup 2900 depicted in FIG. 29, for example, as the RRC connection setup described above. The RRC connection setup 2900 has a data structure of the RRC connection setup transmitted from the base station 120, described by ASN.1.

The RRC connection setup 2900 is a message with "ConnectCellModify" designated by reference numeral 2901 (underlined portion) added to the RRC connection setup defined in TS36.331 of 3GPP. The base station 120 stores a connect cell modify instruction into "ConnectCellModify" of the RRC connection setup 2900.

An information element 3000 depicted in FIG. 30 represents part of "RadioResourceConfigDedicated" designated by reference numeral 2902 (underlined portion) in the RRC connection setup 2900 depicted in FIG. 29. In a case of transmitting the RRC connection setup 2900 depicted in FIG. 29, the base station 120 may store a preferable cell ID list into "neighCellsToAddModList" designated by reference numeral 3001 (underlined portion) in the information element 3000.

FIG. 31 is a diagram depicting still another example of the RRC connection setup in the processing example 3 of the wireless communications system according to the second embodiment. The base station 120 may transmit an RRC connection setup 3100 depicted in FIG. 31, for example. The RRC connection setup 3100 has a data structure of the RRC connection setup transmitted from the base station 120, described by ASN.1.

The RRC connection setup 3100 is a message with "RRCConnectionSetup-v13xy-IEs" as designated by reference numeral 3101 (underlined portion) added to "nonCriticalExtension" of the RRC connection setup defined in TS36.331 of 3GPP, the message having the contents of "ConnectCellModify" and "preferableCellIdList" as designated by reference numeral 3102 (underlined portion).

The base station 120 stores a connect cell modify instruction into "ConnectCellModify" of the RRC connection setup 3100. The base station 120 stores a preferable cell ID list into "preferableCellIdList" of the RRC connection setup 3100.

Configuration may be such that the base station 120 does not include "preferableCellIdList" in the RRC connection setup 3100. In this case, the base station 120 may store the preferable cell ID list into "neighCellsToAddModList" of "RadioResourceConfigDedicated" in the RRC connection setup 3100.

"neighCellsToAddModList" in the RRC connection setup 3100 is similar to "neighCellsToAddModList" in the information element 3000 depicted in FIG. 30.

In this manner, according to the wireless communications system of the second embodiment, the base station 120 stores a connect cell modify instruction into a contention resolution in the random access procedure and transmits the contention resolution whereby the connected cell of the terminal 110 can be controlled. As a result, load balancing between cells can be performed according to the load statuses of cells.

The base station 120 stores plural preferable cell IDs into the contention resolution whereby the probability that a cell with radio quality satisfying a predetermined condition is present within cells specified by the base station 120 according to the load statuses of cells can be increased. As a result, the terminal 110 can be connected to a less-loaded cell so that load balancing between cells can be performed. The probability of successful connection of the terminal 110 is increased whereby increases in the processing amount of apparatuses or in the amount of signaling can be suppressed.

Similar to the first embodiment, also in the second embodiment, the unfavorable cell ID may be used instead of the preferable cell ID. For example, the base station 120 may store into the contention resolution, plural unfavorable cell IDs selected according to the load statuses of cells, together with the connect cell modify instruction. As a result, the terminal 110 can preferably connect to cells different from heavily-loaded cells specified by the unfavorable cell IDs. Hence, the possibility of connection of the terminal 110 to a less-loaded cell is increased whereby load balancing between cells can be performed.

In the embodiments described above, the preferable cell ID or the unfavorable cell ID can be for example a 9-bit physical cell identity (PCI) assigned to cells. The preferable cell ID or the unfavorable cell ID may be some bits of the PCI. As a result, increases in the overhead can be suppressed. Some bits of the PCI are, for example, the lower X bits (X is 1 to 8) of the PCI. In this case, in the cell planning, PCIs having the same lower X bits are not assigned to cells formed by the same base station or neighboring base stations.

As set forth hereinabove, according to the wireless communications system, the wireless apparatus, and the processing method, load balancing between cells can be performed according to the statuses of cells.

For example, since the terminals can connect to less-loaded cells, the throughput in the system can be improved. For example, a case is assumed where the transmission capacity (speed) per cell is 100 and the traffic per user is 10 (i.e., saturated when the number of connected users reaches 10). The number of current connected users of the cell #1 is assumed to be 10 and the number of current connected users of the cell #2 is assumed to be 5 (i.e., the current system throughput is 150).

In a case where the load balancing according to the above embodiments is not performed, when a new user transmits in the cell #1, the transmission capacity (100) of cell #1 is shared by 11 users and therefore, the system throughput remains 150. On the contrary, by performing the load balancing according to the above embodiments, the new user can connect to the less-loaded (idle) cell #2 and therefore, the system throughput becomes 160. Accordingly, a 7% improvement in system throughput is achieved. Increases in the number of transmitting terminals leads to a further improvement in system throughput.

For example, for cell selection, it is conceivable that the base station may set a priority of each frequency for the terminals, using broadcast information, etc. In this case, however, the priority information is information common to the terminals and therefore, concentration (uneven distribution of standby terminals) to a high-priority frequency carrier cell may occur.

To distribute terminals among the frequency carrier cells, it is conceivable that the selection probability of each cell may be specified by the broadcast information. Since the updating interval of the broadcast information is long (e.g., 640 to 40960 [ms]), however, a delay may occur in coping with a change in the load statuses. In this case, low throughput or call loss may result. Due to control using the selection probability, deviation from a target probability may occur.

On the contrary, according to the embodiments described above, a connect cell modify instruction can be transmitted individually to terminals by the random access response or the contention resolution whereby a concentration of load at a specific cell can be avoided. Load balancing control according to the load status (the degree of congestion) of each cell at those times becomes possible.

As compared with the method of setting the selection probability by the broadcast information, for example, use of the random access response or the contention resolution can shorten the control interval. This leads to rapid coping with a change in the load status, suppression of concentration of load to a specific frequency carrier cell, and effective use of the radio resources.

As compared with the method of performing handover after a temporary connection to an arbitrary cell, for example, the connected cell can be changed at an earlier stage. The complex signaling or processing accompanying handover can be avoided.

According to the embodiments described above, use of the random access procedure enables load balancing between cells according to the statuses of cells to be performed at the time of not only access call to the terminal but also outgoing access from the terminal. For example, according to the embodiments described above, the load balancing between cells can be performed at the initial access of the terminal to cells. The initial access of the terminal is triggered by, for example, location registration (attach), location registration update (tracking area update), or a service request. The service request is, for example, a request for various services such as a telephone call, mail, and web access. According to the embodiments described above, also when the terminal is called in paging to perform the random access procedure, the load balancing between cells can be performed. Accordingly, the load balancing between cells can be performed according to the statuses of cells also at the time of incoming access such as an incoming telephone call, reception of mail, and reception of push notification of interactive app. Examples of mail include e-mail and short message service (SMS).

The embodiments described above can be used instead of the prior art such as setting the priority of each frequency, for example. The embodiments described above may be used in combination with the prior art. As a result, a change in load statuses can be handled rapidly. For example, in a configuration using the priority of each frequency, when deviation in the distribution of idle mode terminals remains, the deviation can be corrected by combining the embodiments described above.

According to one aspect of the present invention, an effect is achieved in that load balancing between cells can be performed according to the statuses of the cells.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
a first wireless apparatus; and
a second wireless apparatus, wherein
in a case of receiving from the second wireless apparatus, a random access preamble in an initial access of the second wireless apparatus to a first cell of the first wireless apparatus, the first wireless apparatus transmits a response signal for the random access preamble, the response signal including an instruction to change a connected cell to a cell different from the first cell, and
the second wireless apparatus transmits based on the instruction included in the response signal transmitted from the first wireless apparatus, a random access preamble in an initial access to a second cell different from the first cell.

2. The wireless communications system according to claim 1, wherein
the first wireless apparatus transmits the response signal including an identifier of a cell different from the first cell, and
the second wireless apparatus transmits the random access preamble to the second cell selected based on the identifier included in the response signal.

3. The wireless communications system according to claim 2, wherein
the first wireless apparatus transmits the response signal including an identifier of a cell different from the first cell and selected from among connection candidate cells, according to load statuses of the connection candidate cells.

4. The wireless communications system according to claim 2, wherein
the first wireless apparatus transmits the response signal including an identifier of a cell different from the first cell and selected from among connection candidate cells, according to differences in frequency from the first cell.

5. The wireless communications system according to claim 2, wherein the second wireless apparatus measures a radio quality of cells different from the first cell and selected based on the identifier included in the response signal, the second wireless apparatus transmitting the random access preamble to a cell for which the measured radio quality satisfies a predetermined condition.

6. The wireless communications system according to claim 5, wherein
the first wireless apparatus transmits the response signal including identifiers of cells different from the first cell and to which the second wireless apparatus should preferably connect, and
the second wireless apparatus measures radio qualities of the cells indicated by the identifiers, in a case of the radio quality of at least one of the cells indicated by the identifiers satisfying the predetermined condition, the second wireless apparatus transmitting the random access preamble to the at least one of cells, and in a case of none of the cells indicated by the identifiers satisfying the predetermined condition, the second wireless apparatus transmitting the random access preamble to a cell among connectable cells and different from the cells indicated by the identifiers.

7. The wireless communications system according to claim 5, wherein
the first wireless apparatus transmits the response signal including identifiers of cells different from the first cell and to which the second wireless apparatus should preferably avoid connecting, and
the second wireless apparatus measures radio qualities of cells different from the cells indicated by the identifiers, in a case of the radio quality of at least one of the different cells satisfying the predetermined condition, the second wireless apparatus transmitting the random access preamble to the different cell, and in a case of none of the different cells satisfying the predetermined condition, the second wireless apparatus transmitting the random access preamble to at least one of the cells indicated by the identifiers.

8. The wireless communications system according to claim 2, wherein
the first wireless apparatus transmits the response signal including identifiers of a plurality of cells different from the first cell.

9. The wireless communications system according to claim 8, wherein
the first wireless apparatus transmits the response signal including information capable of identifying priorities of connection in the plurality of cells.

10. The wireless communications system according to claim 2, wherein
the cell indicated by the identifier is a cell selected from among cells including cells formed by a wireless apparatus different from the first wireless apparatus.

11. The wireless communications system according to claim 1, wherein
the first wireless apparatus transmits the response signal including the instruction, according to a load status in the first cell at the time of reception of the random access preamble from the second wireless apparatus.

12. The wireless communications system according to claim 1, wherein
the response signal is a random access response to the random access preamble in the initial access of the second wireless apparatus to the first cell of the first wireless apparatus, and
the first wireless apparatus stores the instruction into a reserved bit in a payload of the random access response.

13. The wireless communications system according to claim 12, wherein
in a case of storing the instruction into the reserved bit, the first wireless apparatus stores identifiers of cells different from the first cell into a region different from the reserved bit in the payload, and
the second wireless apparatus transmits the random access preamble to the second cell selected based on the identifiers.

14. The wireless communications system according to claim 1, wherein
the response signal is a random access response to the random access preamble in the initial access of the second wireless apparatus to the first cell of the first wireless apparatus, and
the first wireless apparatus stores the instruction into a reserved bit of 2 bits in a medium access control (MAC) subheader of a MAC protocol data unit (PDU) of the random access response.

15. The wireless communications system according to claim 14, wherein
in a case of storing the instruction into the reserved bit, the first wireless apparatus stores into a backoff indicator (BI) field of the MAC subheader, information indicating a probability of changing the connected cell to a cell different from the first cell, and
the second wireless apparatus transmits the random access preamble to the second cell selected based on the information indicating the probability.

16. The wireless communications system according to claim 14, wherein
in a case of storing the instruction into the reserved bit of 2 bits, the first wireless apparatus stores a part of an identifier of a cell different from the first cell into a BI field of the MAC subheader, and
the second wireless apparatus transmits the random access preamble to the second cell selected based on the part of the identifier.

17. The wireless communications system according to claim 1, wherein
the response signal is a random access response to the random access preamble in the initial access of the second wireless apparatus to the first cell of the first wireless apparatus, and
the first wireless apparatus stores the instruction into a channel state information (CSI) request field of an uplink (UL) grant in a payload of the random access response.

18. The wireless communications system according to claim 1, wherein
the response signal includes the instruction and information for transmitting a scheduled transmission to the first wireless apparatus from the second wireless apparatus receiving the response signal, and
the second wireless apparatus transmits the scheduled transmission to the second cell, based on the information for transmitting a scheduled transmission included in the response signal.

19. A wireless apparatus capable of communicating with a second wireless apparatus, the wireless apparatus comprising:
a receiver configured to receive from the second wireless apparatus, a random access preamble in an initial access of the second wireless apparatus to a first cell of the wireless apparatus; and a transmitter configured to transmit a response signal to the random access preamble in a case of the random access preamble being received by the receiver, the response signal including an instruction to change a connected cell to a cell different from the first cell.

20. A wireless apparatus capable of communicating with a second wireless apparatus, the wireless apparatus comprising:

a transmitter configured to transmit a random access preamble in an initial access of the wireless apparatus to a first cell of the second wireless apparatus; and a receiver configured to receive from the second wireless apparatus, a response signal to the random access preamble transmitted by the transmitter, the response signal including an instruction to change a connected cell to a cell different from the first cell, the transmitter transmitting a random access preamble in an initial access to a second cell different from the first cell, based on the instruction included in the response signal received by the receiver.

* * * * *